US008706268B2

(12) United States Patent
Pigsley

(10) Patent No.: US 8,706,268 B2
(45) Date of Patent: Apr. 22, 2014

(54) ASYNCHRONOUS CONTROL OF MACHINE MOTION

(71) Applicant: Kimberly-Clark Worldwide, Inc., Neenah, WI (US)

(72) Inventor: Kenneth Allen Pigsley, Neenah, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 0 days.

(21) Appl. No.: 13/752,106

(22) Filed: Jan. 28, 2013

(65) Prior Publication Data

US 2013/0218305 A1 Aug. 22, 2013

Related U.S. Application Data

(62) Division of application No. 12/750,066, filed on Mar. 30, 2010, now Pat. No. 8,364,290.

(51) Int. Cl.
| G05B 19/18 | (2006.01) |
| G06F 3/00 | (2006.01) |
| G06F 5/00 | (2006.01) |
| G06F 1/12 | (2006.01) |
| G06F 1/00 | (2006.01) |
| G06F 13/42 | (2006.01) |

(52) U.S. Cl.
USPC ............... 700/61; 710/58; 713/400; 713/500

(58) Field of Classification Search
USPC .............. 700/56, 61; 710/58; 713/400, 500
See application file for complete search history.

(56) References Cited

U.S. PATENT DOCUMENTS

| 4,570,217 | A | * | 2/1986 | Allen et al. ..................... 700/83 |
| 4,786,847 | A | * | 11/1988 | Daggett et al. ............. 318/568.2 |
| 4,823,715 | A | * | 4/1989 | Horie et al. .................... 112/315 |
| 5,341,091 | A | * | 8/1994 | Kurita ...................... 324/750.01 |
| 7,541,767 | B2 | * | 6/2009 | Ruppel et al. ................. 318/638 |
| 8,000,818 | B1 | * | 8/2011 | Bhatt et al. ....................... 700/86 |
| 2003/0009242 | A1 | * | 1/2003 | Bocchi ............................. 700/61 |
| 2004/0164698 | A1 | * | 8/2004 | Cazzavillan et al. ......... 318/574 |
| 2005/0253547 | A1 | * | 11/2005 | Cazzavillan et al. ......... 318/575 |

FOREIGN PATENT DOCUMENTS

WO WO03/005135 * 1/2003 ............. G05B 19/00

* cited by examiner

*Primary Examiner* — Ronald Hartman, Jr.
(74) *Attorney, Agent, or Firm* — Dority & Manning, P.A.

(57) ABSTRACT

A method of machine control can include providing at least a system master signal, selectively synchronizing at least subsystem master signal to the system master signal based on the value of the system master signal, and carrying out at least one operation based on the value of the other master signal. For example, a machine controller may provide a system virtual master signal and synchronize one or more module virtual master signals to the system virtual master based on the system virtual master count value. One or more components of the module may operate based on the count value of the module virtual master signal. The use of an asynchronous control method may advantageously increase the flexibility of the machine. Because the operation of the components of the machine may depend on respective virtual master signals, a machine using asynchronous control methods may advantageously continue operating one component or module in the event of a fault involving other components. Additionally, component operation can be redefined while other components of the machine continue to run.

13 Claims, 29 Drawing Sheets

ASYNCHRONOUS CONTROL OF MACHINE MOTION

RELATED APPLICATIONS

The present application is a divisional application and claims priority to U.S. patent application Ser. No. 12/750,066, filed on Mar. 30, 2010, which is incorporated herein by reference.

BACKGROUND

Generally speaking, a machine can comprise one or more components mechanically, electrically, electronically, and/or otherwise operated to perform one or more tasks. Modern industrial automation relies on successful control of machines to ensure that the task(s) of the machines are performed in a desired manner.

Control of machines can be achieved in different ways. For example, in some control schemes, the motion of machine components is synchronized to a master axis so that component motion depends on the position of the master axis. The synchronization may be the result of a physical connection of components to the master axis via gears, cams, and the like. Additionally or alternatively, a signal representative of a master axis, such as a count value, is generated or obtained, with the component motion dependent on the count value. For example, an encoder can be used to obtain a count value based on the position of the axis or a "virtual master" count value can be generated. However, synchronous control may not take full advantage of a machine's operational capabilities, since all of the machine axes are coordinated with the virtual master all of the time.

SUMMARY

Objects and advantages of the invention will be set forth in part in the following description, or may be obvious from the description, or may be learned from practice of one or more embodiments the present invention.

A method of asynchronously controlling a machine can include producing a system master count that varies from an initial count to a final count over an operational cycle or series of operational cycles. The system master count is the count that is not based on any other count values in the control system, but instead serves, directly or indirectly, as the basis for controlling other components and/or selectively synchronizing other masters (referred to as "sub-system" masters). For instance, a system master count may be obtained using an encoder, or a virtual master may be generated by a machine controller.

Although many examples herein refer to a system master count as the basis for component actions and other count values in a single machine, it should be understood that, in some embodiments, the system master count could serve as the basis for operations across multiple different machines.

The method can further include providing at least one sub-system master count, with each sub-system master count based directly or indirectly on the system master count so as to begin when the system master count reaches a respective lock-on count value. One or more components of the machine can be operated based on a component operating profile defining the motion of the component(s) based on the value of the at least one sub-system master count. As will be discussed below, the sub-system master count can correspond to count values which are produced to control components at different levels of system and machine organization. For instance, a sub-system master count may refer to at least one of: a machine master count (when the system master count controls multiple machines), a module master count, or a master count used to control a particular component or component group.

A sub-system master count can be based on the system master count directly. However, some sub-system master counts may be based indirectly on another sub-system master count which is based on the system master count. As an example, a module (sub-system) master count may be based on a machine master count, with several component master counts based on the module master count.

The method can also include stopping at least one of the sub-system master counts without stopping the system master count. For example, the sub-system master count may reach an end value and stop, or may be stopped earlier in response to a fault or a control command in response to a process condition and/or operator input. In the event of a fault or a stop command, the sub-system master count may be stopped in a controlled manner, for example, by a gradual ramp-down in the count rate or a full-torque stop of moving components all without stopping the system master count or interfering with the other sub-system master counts. Thus, one or more of the process or processes carried out by operating the machine components can be engaged and disengaged in a controlled manner at will without necessarily shutting down the other process(es) of the machine, since the system master count continues.

Operating one or more components is meant to include causing any component or group of components to perform in a desired manner. This may include, for example, causing a component or assembly to move in a defined pattern, causing a component to move along a defined path, or to respond to other motion in a defined way. Operating may also include performing actions, including, but not limited to: beginning, ending, or regulating the flow or movement of a material, and beginning, ending, or regulating the flow of energy in any form (e.g. light energy, heat energy, etc.). "Operating" a component therefore will depend on the intended function(s) of the component(s) that are being operated. A component operating profile is meant to include any suitable means for directing the operation of a component or group of components. For example, as is known in the field of controls, a motion profile may be specified by a physical or electronic cam.

In some embodiments, the method can further comprise determining a desired point of synchronization for one or more of the components, subsections, modules, or machines, and selecting at least one lock-on count value based on the determined desired point of synchronization. For example, operation of a machine may proceed based on a control program that specifies one or more desired sequences of operation for components and/or modules of the machine. Based on the desired sequence of operation, a lock-on count value can be selected for each module or component so that the respective module or component operates when desired by appropriately triggering the master count upon which the component's operation is based.

In several examples below, this type of operation is described as "relative timing." However, the term "relative timing" is used as shorthand and is not meant to infer that the control system and/or machine components consider actual time values or intervals. Instead, the actual time intervals over which operations are performed and time intervals between synchronization points can vary since, in some embodiments, synchronization points are count-based. The actual time intervals and time values will therefore vary according to the count rate per time unit.

For example, in some embodiments, the machine comprises at least a first and second module. Each module can comprise one or more components. Providing at least one other master signal can comprise providing a first module master count that begins when the system master reaches a first lock-on count value. Additionally, the method step of "providing" can further comprise providing a second module master count that begins when the system master reaches a second lock-on count value. Furthermore, operating can comprise operating the component(s) of the first module based on the first module master count and operating the component(s) of the second module based on the second module master count.

For example, a control program may specify a desired sequence of operation for a machine comprising a plurality of modules at the module level and not necessarily on a component-by-component basis. The first and second lock-on count values can be selected by determining the desired relative timing of operation for the modules; of course, particular desired points of operation for the module components may be considered.

Of course, a machine may comprise more modules, some or all of which may operate in sequence. Additionally, because each module operates based on its own respective master count, the modules can be selectively included or not included in any given sequence. Furthermore, modules may operate at different lock-on points in different sequences. Depending on the particular sequence, process, and machine, some modules may operate simultaneously. Also, depending on the operational profiles and additional virtual masters used (such as sub-process virtual masters), two different masters may begin counting at the same time but the respective components whose motion is based off the count of the two masters may operate at different times.

Furthermore, the modules can operate independently of the status of the other modules. For example, the method can further comprise determining if the first module has encountered a fault. If a fault is encountered, the method can comprise mechanically and/or electrically decoupling the first module from other machine components in motion, if any, stopping the first module master count, and determining if the second module lock-on count value should be changed.

As an example, a winding machine can comprise a plurality of winding modules that operate in sequence to wind a material. A first winding module can encounter a fault. Rather than stopping operation of the machine, the first winding module can be removed from operation and its module master count can be stopped. For example, the module may decouple itself from the other components that are in motion (such as, in this example, a web moving through the machine) and/or the machine may include apparatus to remove the module.

However, the second module can operate without regard to the status of the first module. This assumes, of course, that the first module's fault condition is not the result of a larger systemic problem (e.g. a problem with the web conveyor). The second module may operate at the same point at which it would have operated in absence of the fault. However, the machine central controller may determine that the second module can operate earlier than originally intended since the first module is out of operation. If so, the machine controller can determine a new value for the second lock-on value and direct the second module to begin operation earlier by specifying a different lock-on value to the controller of the second module. This may advantageously reduce waste, since by engaging the second module at an earlier point, less material will move through the machine without being wound.

In some embodiments, the method can further comprise changing the operating profile of at least one component while the master count upon which the operation of the component is based is stopped. For example, in a machine comprising a plurality of modules, one module may be stopped while the other modules continue to engage in operations, since the system master is continuing to cycle. While the module is stopped, the motion profile for one or more components can be changed. As an example, one or more electronic cam profiles of components associated with the module can be re-defined so that the module performs differently. Once the component profile(s) are re-defined, the module can be placed back into operation.

For example, in a winding machine, different product characteristics can be achieved by, e.g. changing the tightness of a roll. Component motion profiles that change roll tightness (discussed in detail later below) can be changed between runs so that different products can be made using the same module. However, these changes can be made without stopping operation of the other modules and components of the machine.

In addition to or instead of redefining motion profiles between runs, motion can also be adjusted while a component is in operation. For instance, in some embodiments, at least one sub-system master count is provided in a manner so that the rate of the system master count and at least one sub-system master count are not equal during at least part of an operational cycle. Moreover, the ratio between the system master count and the sub-system master count may not always be constant over time.

As an example, a module master count rate can be increased or decreased to change the operation of the components (and possibly other, sub-module, masters) based off the module master count. For instance, the method can further comprise receiving feedback during the operation of one or more components and, based on the feedback, increasing or decreasing the number of module counts which occur over the interval of a system master count. As another example, the ratio of counts of a sub-system master count may be varied relative to a module master count which it is slaved to.

When varying the ratio of count rates between a sub-system master count and the master count to which it is slaved, it may be advantageous to consider possible re-synchronization issues. For example, a control program or sequence may be based on the assumption that a sub-system master count occurs over a given count interval of one or more other sub-system master counts and/or a given interval of the system master. If the sub-system master count rate is decreased relative to master counts above it, then it may not complete operation during the assumed count interval. Put another way, it may operate too "slowly." On the other hand, if the sub-system master count rate is increased relative to the master counts above it, then it may complete operation over a shorter interval and thus operate too "quickly." Accordingly, in some embodiments, after one or more rate variances the sub-system count rate is again varied to compensate for any other earlier count rate variances so the sub-system count cycle completes over the original interval. Additionally or alternatively, the control program(s) can include a "cushion" in the assumed count intervals for the master(s) above the sub-system master count to allow for some decrease in the sub-system master count rate.

In some embodiments, at least one sub-system master count, begins at a negative count value and increases to a positive count value. One or more component operating profiles based off the sub-system master count can define at least two phases of operation, including a startup phase that begins at the negative count value and during which the at least one component is readied to provide at least one desired action, and a run phase that begins when the count value reaches zero and during which the component performs the at least one desired action.

For example, a motion profile may define the speed of a rotating component that is mechanically coupled to other components of the machine that are in motion. For instance, the rotation of a mandrel may be controlled by one or more motors. In order to engage the mandrel with a web that is moving at machine speed, the mandrel generally is brought up to a speed before it is engaged. The startup phase can comprise the time during which the mandrel motor is brought up is to operating speed, while the run phase can comprise the time during which the mandrel is engaged in a winding operation (and possibly afterward).

Operation in multiple phases may be achieved by directly basing component motion off the sub-system master count including negative values, or may be achieved by using one or more intervening sub-system master counts. If one or more intervening sub-system master counts are used, the components need not be configured themselves to depend on negative count values.

As was noted above, in some embodiments, the method can comprise providing at least one sub-system master count (a "further" sub-system master count) which begins when an intervening sub-system master count reaches a respective lock-on count value. One or more components may be based on the "further" sub-system master count. For example, a machine may provide a system master count and one or more module master counts that are based off the system master count. At least one further master count may be based off a module master count. This may advantageously allow for asynchronous control of different aspects of operation within a single module.

For example, a winder may comprise a plurality of winding modules, with operation of each winding module based on a respective winding module master. Operation of some winding module components can be based on the value of the winding module master. However, some winding module components may operate based on the value of a sub-module master. As an example, a winding module can comprise components that position a mandrel and determine the rotation of a mandrel. Components related to rotation may depend on a mandrel rotation master count, while components related to positioning of the mandrel (such as the vertical position relative to the web) can depend on a mandrel lift master count. Each of the mandrel rotation and mandrel lift master counts can depend on the value of the module master.

In some embodiments, the method can comprise operating at least one component based on a timed function independent of a virtual master count value. For example, it may be desirable in some instances to operate some components of a module independently of machine (or module) speed. For example, components of a module that perform winding operation may be synchronized to one or more sub-system masters that are synchronized to a system master for at least part of an operational cycle of the system master. However, other components of the module that handle unloading of the finished wound material may operate once the module master count has stopped. Some components may be synchronized to a master for some operations and then may operate independent of a master count value for others. For example, as will be noted below, mandrel lift components may be synchronized to a lift virtual master during a winding operation. However, after the winding operation, the components may be position-controlled via commands in order to move the rolled product into position for removal. If the winding operation proceeds at a high rate of speed, the use of a time or position-based functions may allow for slower handling of the unloading operation than could be achieved if the unloading operation were synchronized to a master count. Similarly, if the winding operation is slow, the unloading operation may occur faster than could be achieved if synchronized to a master count value.

Although this specification provides several examples of components whose operation is synchronized to one or more masters other than a system master, in some embodiments, operation of one or more additional components may be synchronized to the system master. For example, in a winder, motion of the conveyor(s), perforator, and other components that move a web through the winder may be synchronized directly to the system master, or may even serve as the basis thereof.

As used herein, "winder" is generic to a machine for forming a parent roll, and a machine (rewinder) for forming a roll/log from a parent roll. In other words, the word "winder" is broad enough to cover both a "winder" and "rewinder". Generally speaking, winders are machines that roll lengths of material, such as paper, into rolls. These machines are capable of winding lengths of paper (commonly refereed to as paper web) into rolls at high speeds through an automated process. The winding technique used in turret winders is known as center winding. A center winding apparatus, for instance, is disclosed in U.S. Pat. Reissue No. 28,353 to Nystrand, which is incorporated herein by reference. A second type of winding is known in the art as surface winding. A machine that uses the technique of surface winding is disclosed in U.S. Pat. No. 4,583,698. Several examples herein refer to winding machines; however, use of such examples is not meant to limit the control system subject matter set forth herein to winding machines exclusively.

DETAILED DESCRIPTION

Figure 1:
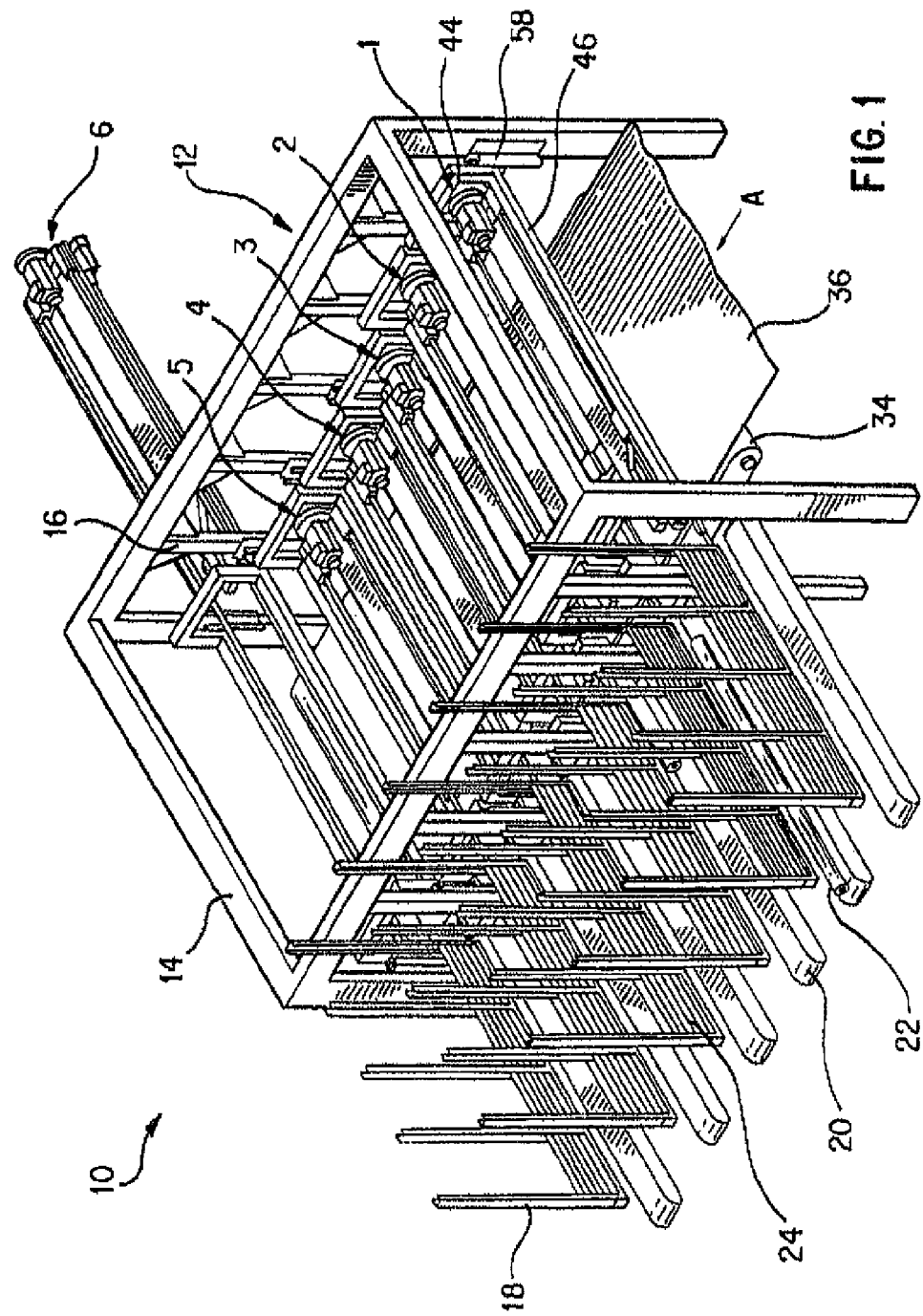
FIG. 1 is a perspective view of one exemplary embodiment of a winder. This winder includes a plurality of independent winding modules that are positioned in the web direction with respect to one another and substantially contained within a modular frame.

Reference will now be made in detail to exemplary embodiments of the invention, one or more examples of which are illustrated in the drawings. Each example is provided by way of explanation of the invention, and not meant as a limitation of the invention. For example, features illustrated or described as part of one exemplary embodiment can be used with another exemplary embodiment to yield still a third exemplary embodiment. It is intended that the present invention include these and other modifications and variations. The terms "including" and "comprising" are used interchangeably and are both meant as open-ended terms.

In several examples herein, asynchronous control methods and systems are discussed in the context of controlling a winder that is capable of winding web from a parent roll to form a rolled product. However, before discussing the structural and operational details of exemplary embodiments of winders, it is important to note that the discussion of particular types and arrangements of machines and functions and tasks performed by such machines is for purposes of example only. Namely, the desired operation of an exemplary winder and exemplary components used to obtain such operation is initially discussed. Further discussion pertaining to exemplary embodiments of winder/rewinders can be found in U.S. patent application Ser. Nos. 10/085,813, filed on Feb. 28, 2002 and 11/799,043, filed on Apr. 30, 2007, both of which are hereby incorporated by reference. Later in the specification, asynchronous control principles that can be used to obtain the desired operation are discussed in more detail. It is to be understood that the subject matter set forth herein may be applied to any type or types of machinery or process, regardless of size, arrangement, intended function, and the like, and is not limited to use only with winders/re-winders.

I. Discussion of Exemplary Aspects of a Modular Winding Machine

A winder may comprise a winding module that has a rotating mandrel that engages the leading edge of a moving web. Upon transfer of the leading edge of the web to the core, the winding mandrel is disengaged from the transport apparatus removing any nip pressure for the remainder of the wind. The web may be wound about the core through the rotation of the center driven mandrel. This type of winding is known as center winding. Additionally, the mandrel may be placed onto the web to form and maintain nip pressure between the winding mandrel and the web. The web may be wound about the core through the rotation of the surface driven mandrel. This type of winding is a form of surface winding. As such, the winding module may wind web into a rolled product by center winding, surface winding, and combinations of center and surface winding. This allows for the production of rolled products with varying degrees of softness and hardness.

Also, in several examples, the control system is used to control a winder that has a plurality of independent winding and other modules. Each individual winding module may wind the web such that if one or more modules are disabled, the remaining modules may continue to wind without interruption. This allows for operator servicing and routine maintenance or repairs of a module to be made without shutting down the winder. This configuration has particular advantages in that waste is eliminated and efficiency and speed of the production of the rolled product is improved.

A winding module 12 as shown in FIG. 1 can be used to wind a web 36 and form a rolled product 22. Although a plurality of independent winding modules 12 may be used to produce rolled products 22, the explanation of the functioning of only one winding module 12 is necessary in order to understand the building process of the rolled product 22.

Figure 5:
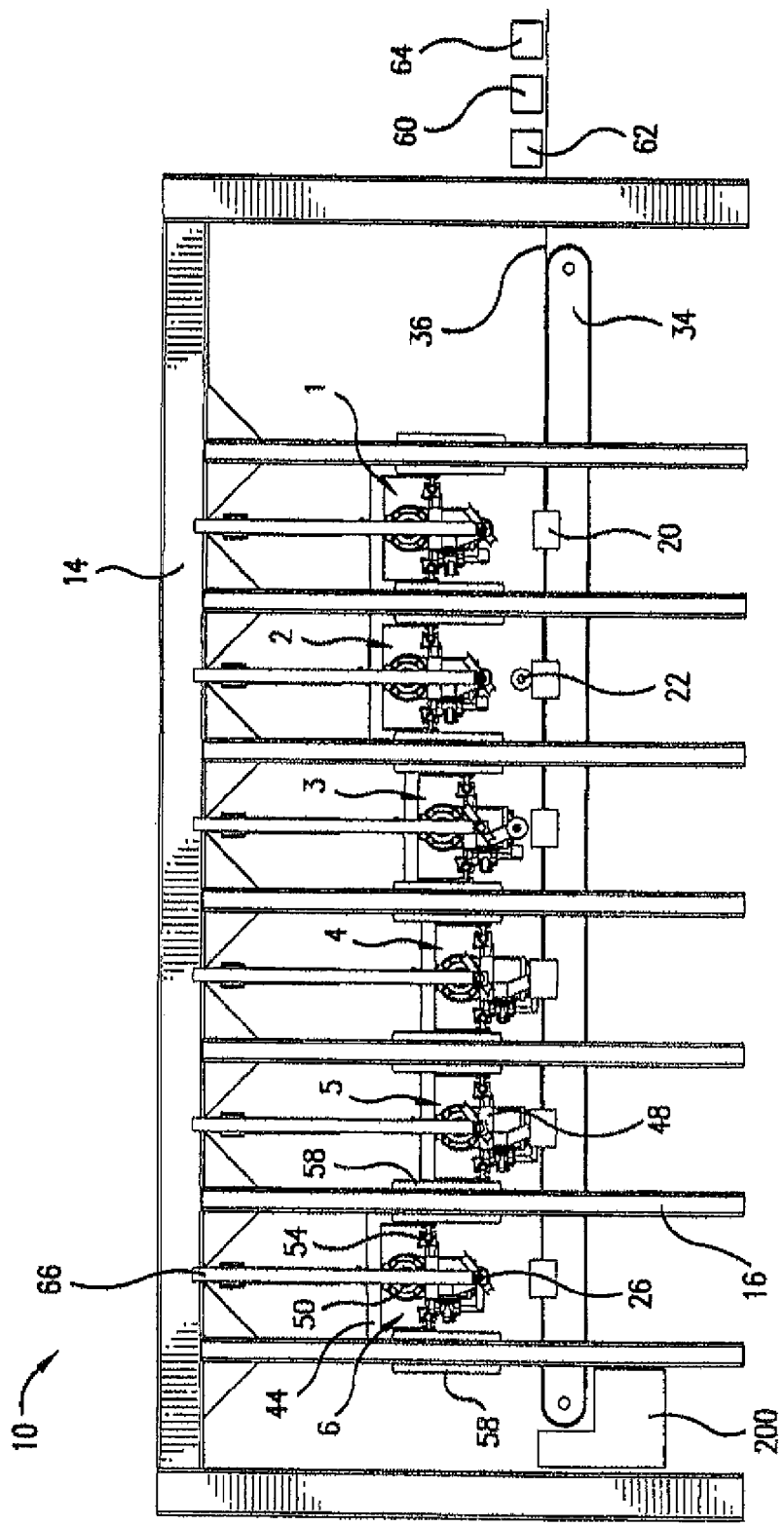
FIG. 5 is a side elevation view of an exemplary embodiment of a winder. The drawing shows winding modules in addition to other modules, which perform functions on a web.
Figure 10:
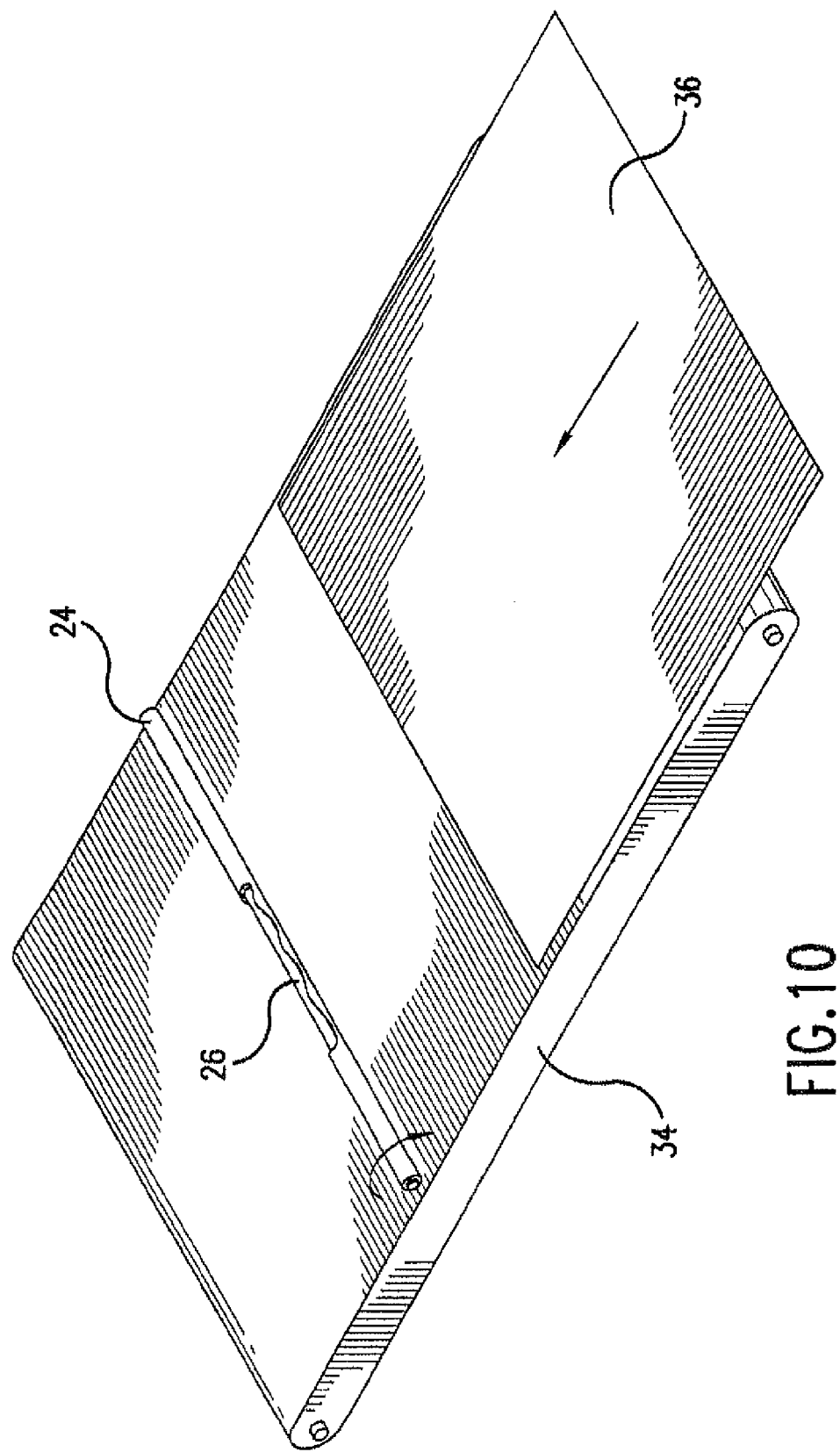
FIG. 10 is a perspective view of a web being transported by a web transport apparatus into proximity with a mandrel having a core.
Figure 15:
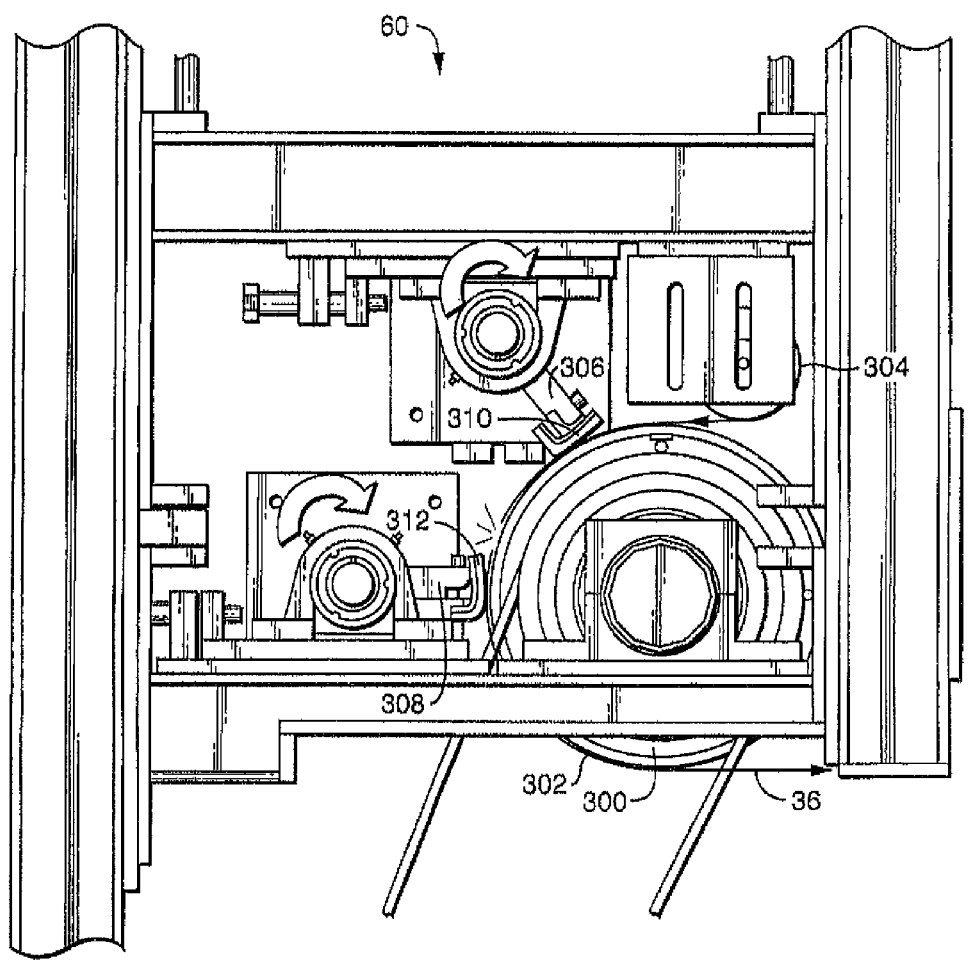
FIG. 15 is a side view of one embodiment of an apparatus for breaking a moving web.
Figure 16:
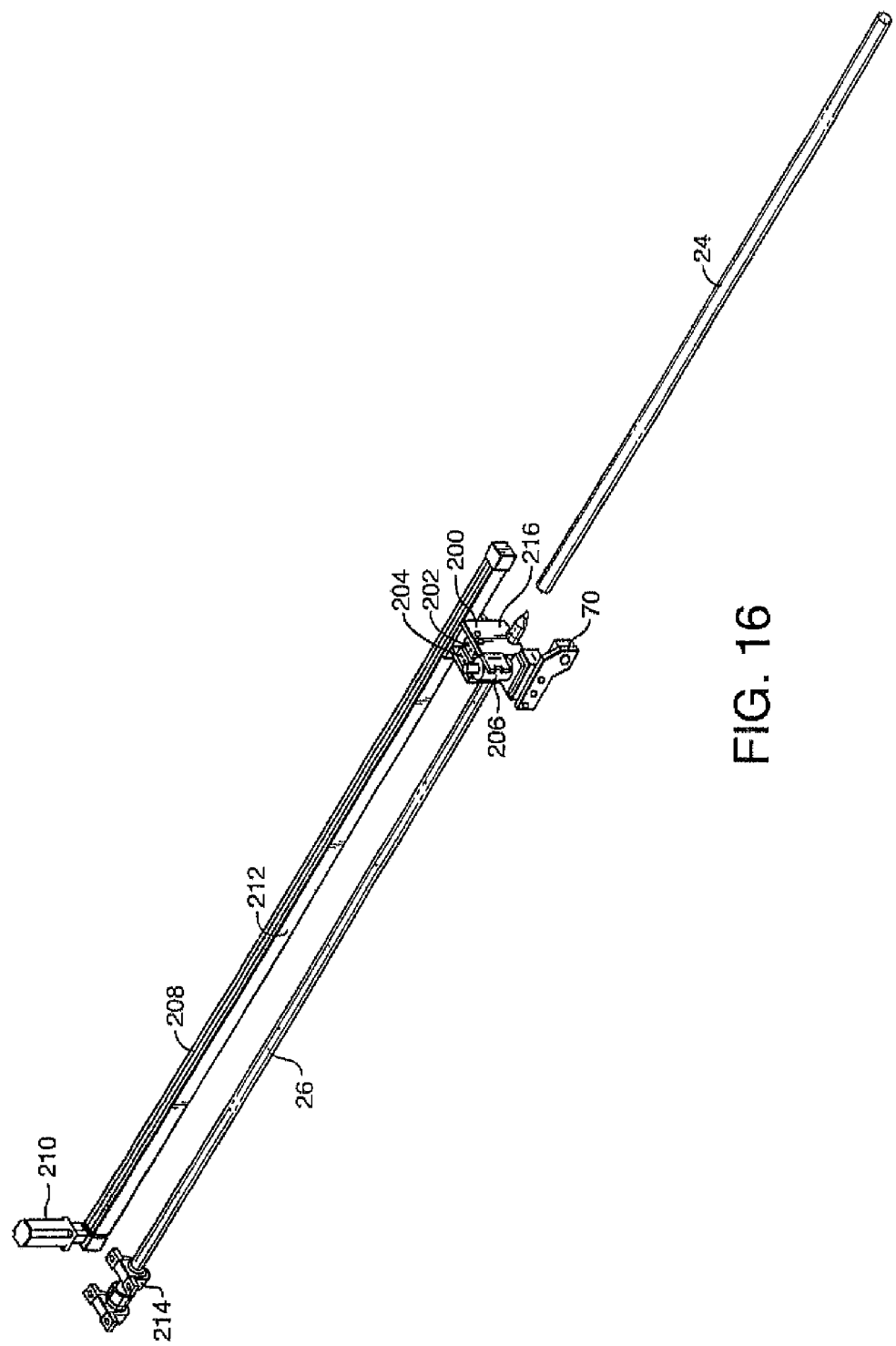
FIGS. 16 through 23 are perspective views of an alternative embodiment of a core loading apparatus showing sequentially a core being loaded onto a mandrel and then a finished product log being stripped from the mandrel.
Figure 17:
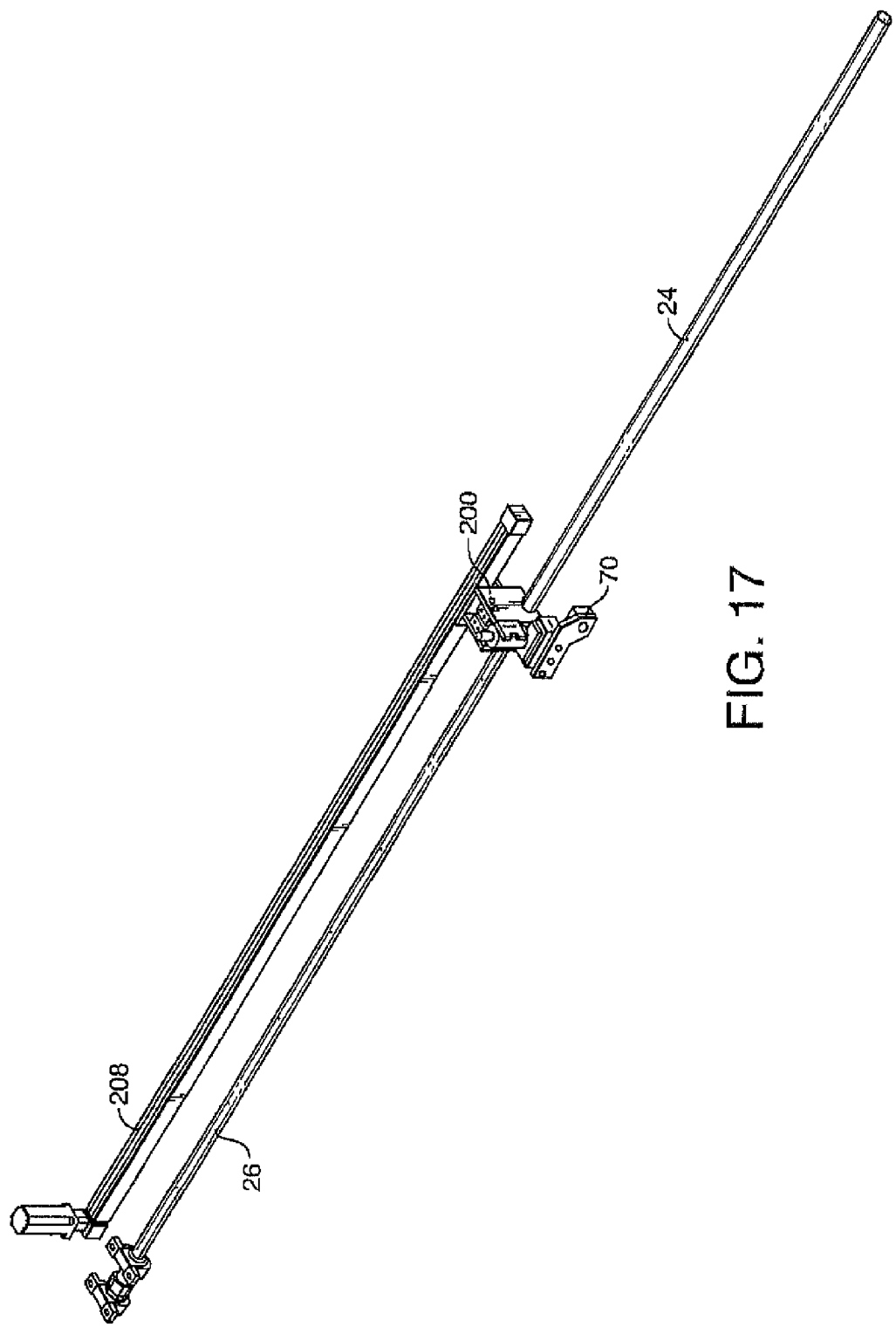
Figure 18:
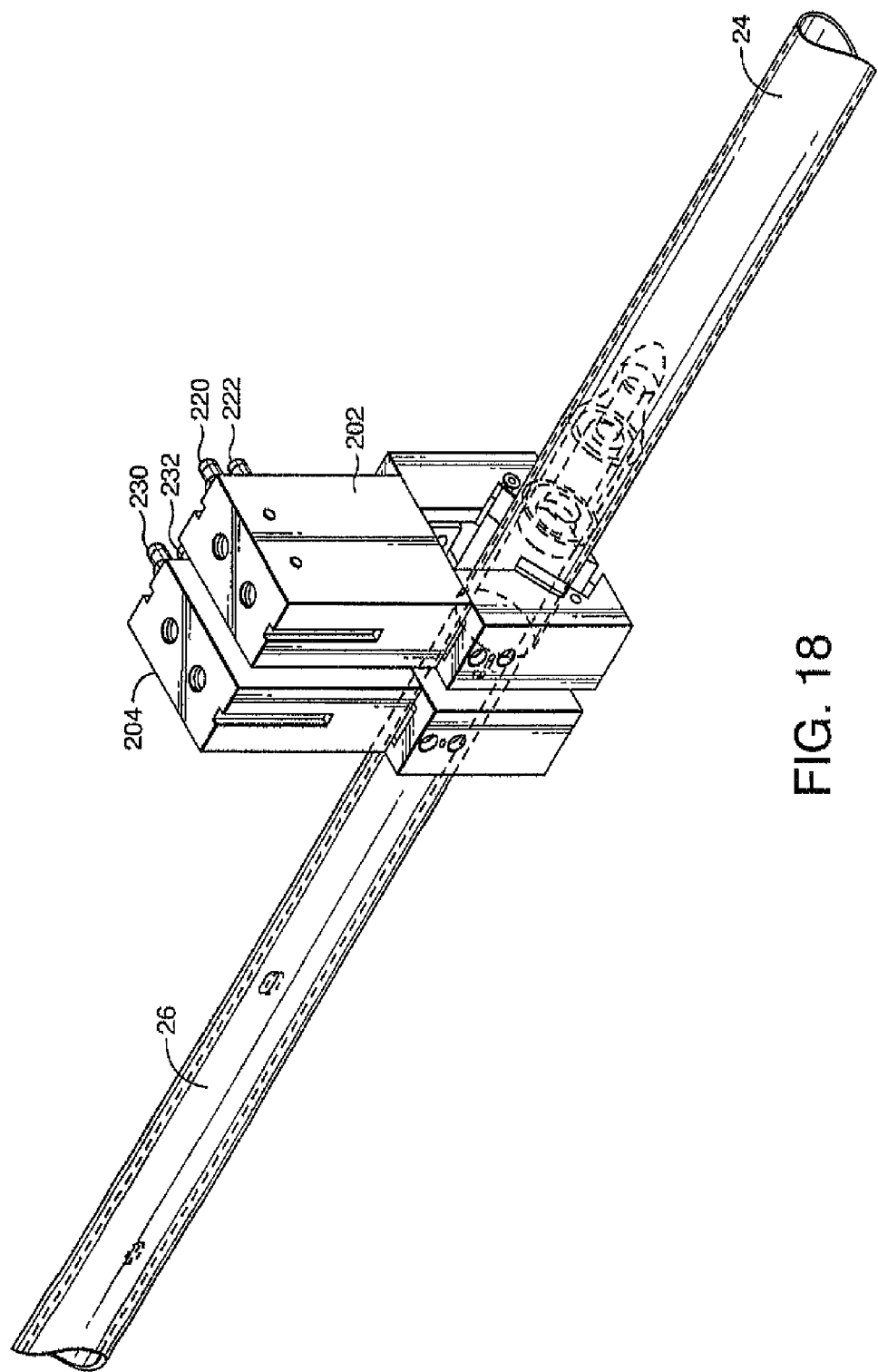

Referring to FIG. 5, a web 36 is transported by a web transport apparatus 34 as shown. The web 36 is cut to a predetermined length by use of, for instance, a cut-off module 60 may be configured as a pinch bar as is disclosed in U.S. Pat. No. 6,056,229. However, any other suitable way to cut the web 36 to a desired length may be employed. For example, another embodiment of a cut-off module 60 is shown in FIG. 15 which will be described in more detail below. Additionally, the web 36 may be perforated by a perforation module 64 and have adhesive applied thereto by a transfer/tail seal adhesive applicator module 62 as also shown in FIG. 5. Additionally, in other exemplary embodiments, adhesion may be applied to the core 24 as opposed to the web 36. Referring back to FIG. 10, the mandrel 26 is lowered into a ready to wind position and awaits the web 36. During, prior to, or after lowering, the mandrel 26 is accelerated so that the speed of the mandrel 26 matches the speed of the web 36. Mandrel 26 has a core 24 located thereon. The core 24 is moved into contact with the leading edge of the web 36. The web 36 is then wound onto core 24 and is attached to core 24 by, for instance, the adhesive previously applied or and by the contact between the core 24 and the web 36.

Figure 11:
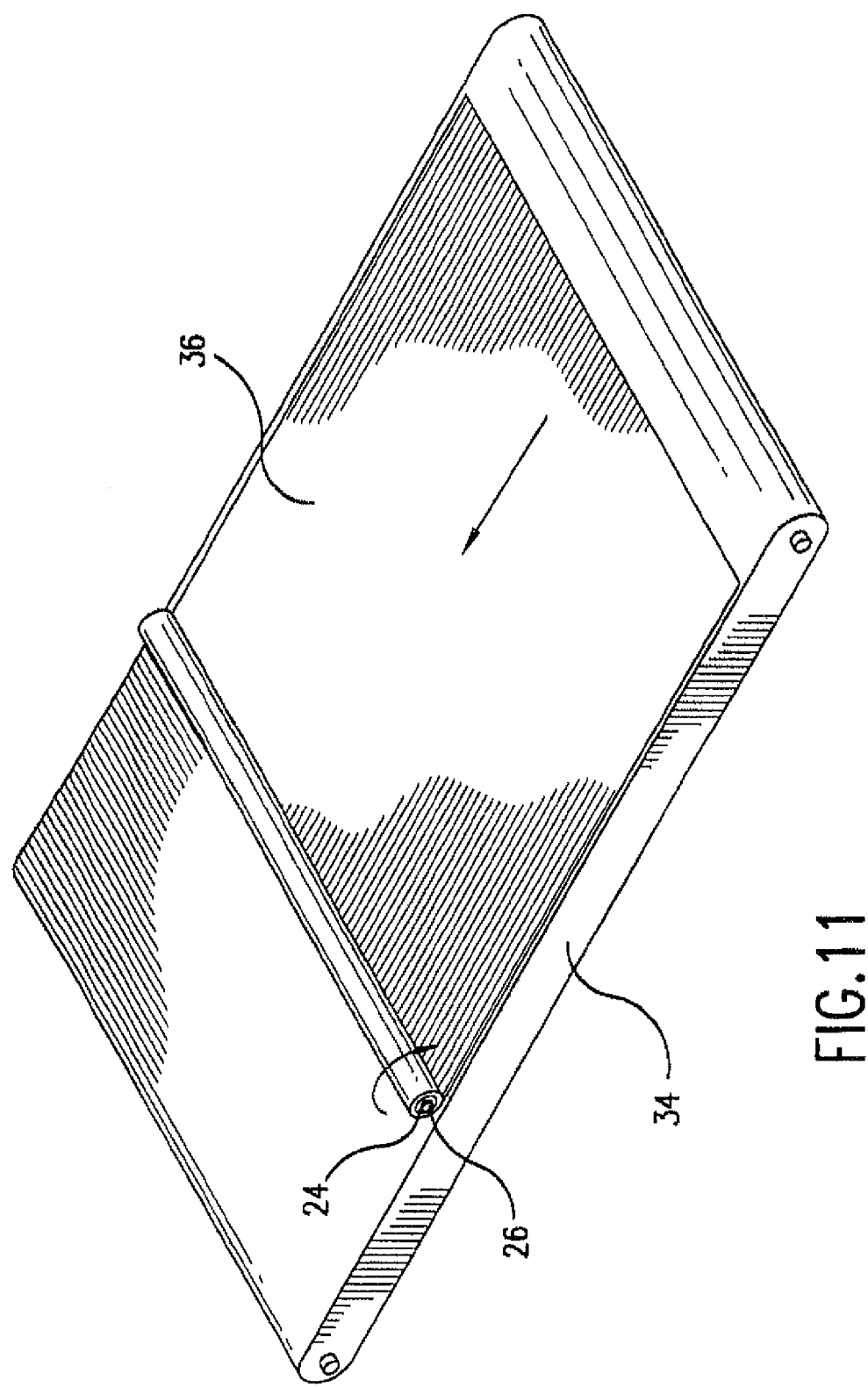
FIG. 11 is a perspective view of a rotating mandrel and core that are winding a web.

FIG. 11 shows the web 36 being wound onto the core 24. The winding of the web 36 onto core 24 may be controlled by the pressing of the core 24 onto the web transport apparatus 34 to form a nip. The magnitude with which the core 24 is pressed onto the web transport apparatus 34 creates a nip pressure that can control the winding of the web 36 onto the core 24. Additionally, the incoming tension of the web 36 can be controlled in order to effect the winding of the web 36 onto the core 24. Another control that is possible to wind the web 36 onto the core 24 involves the torque of the mandrel 26. Varying the torque on the mandrel 26 will cause a variance in the winding of the web 36 onto the core 24. Some or all of these types of winding controls, "nip, tension, and torque differential", can be employed, either alone or in combination. As will be discussed below, these and other controls can be achieved in multiple ways, including by varying cam and other motion profiles, and/or by varying the relative timing of virtual master signals.

If not done before, the web 36 may be cut once the desired length of web 36 has been wound onto the core 24. At this point, the leading edge of the next web 36 will be moved by the web transport apparatus 34 into contact with another winding module 12 (not shown in FIG. 11).

Figure 2:
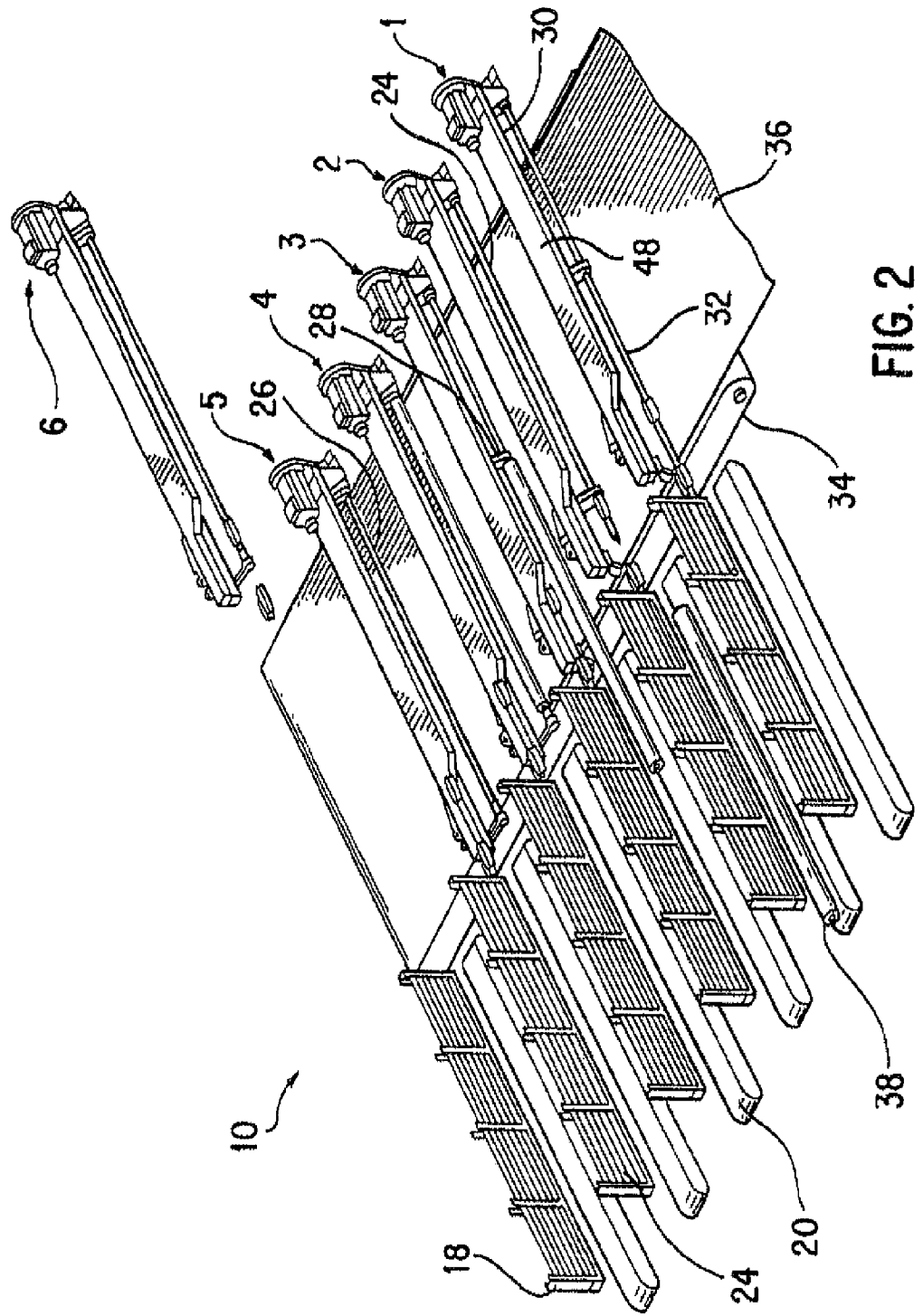
FIG. 2 is a perspective view of an exemplary embodiment of a winder. This drawing shows a plurality of independent winding modules, which are performing the various functions of a log winding cycle.
Figure 12:
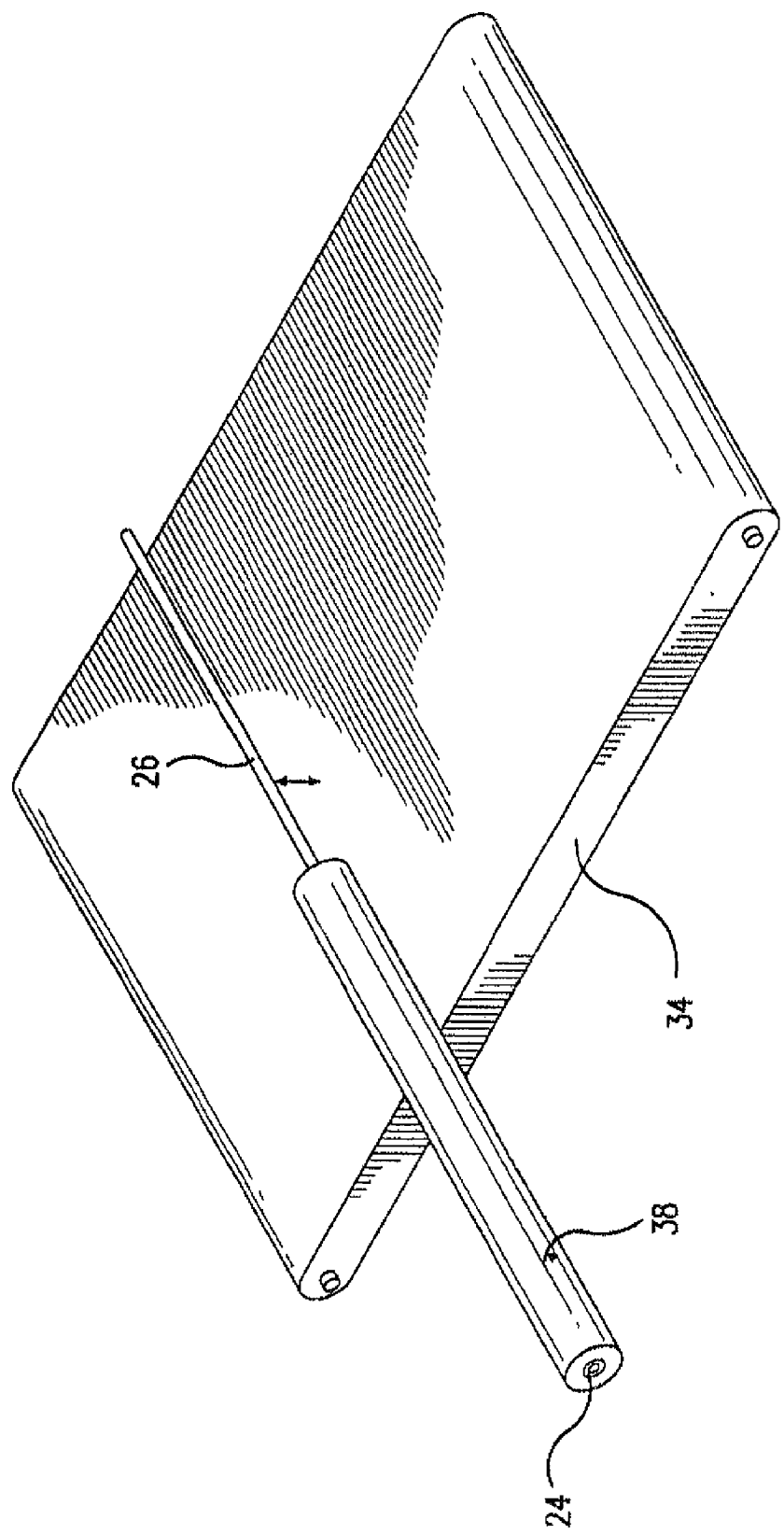
FIG. 12 is a perspective view of a rolled product with a core that is shown being stripped from a mandrel.

FIG. 12 shows the mandrel 26 being moved from a winding position to a position above the web transport apparatus 34 for a log-stripping and core loading operation. The wound length of web 36 is shown in FIG. 12 as being a rolled product 38 with a core 24. Now, a stripping function is carried out that moves the rolled product 38 with a core 24, known in the art as a "log," off of the mandrel 26. This mechanism is shown as a product stripping apparatus 28 in FIG. 2. The rolled product 38 with a core 24 is moved onto a rolled product transport apparatus 20 as shown in FIGS. 1 and 2. In other embodiments, the log does not include a core 24.

Figure 13:
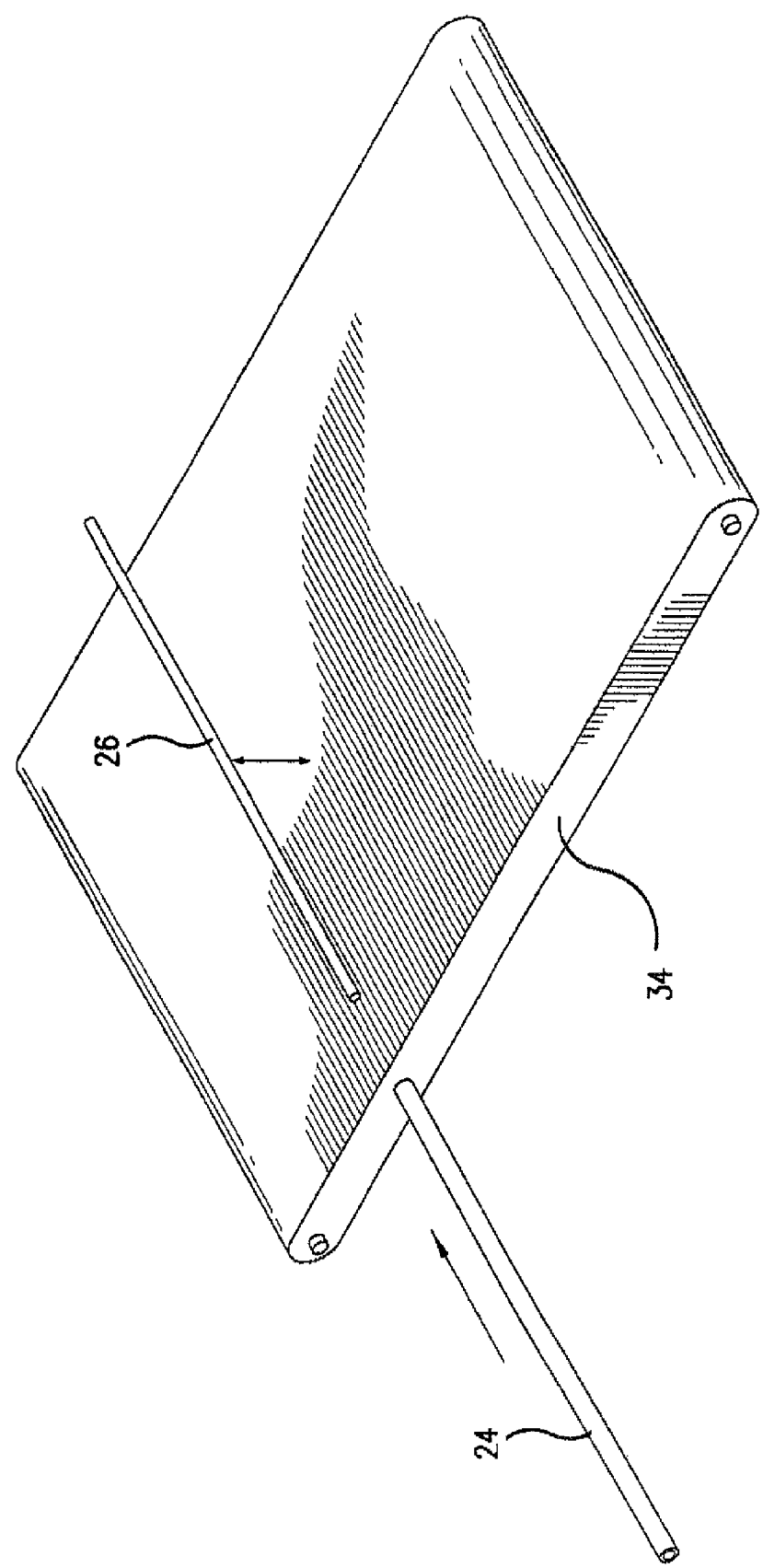
FIG. 13 is a perspective view of a mandrel that is in position to load a core.

Once the rolled product 38 with a core 24 is stripped from the mandrel 26, the mandrel 26 is moved into a core loading position as shown in FIG. 13. The product stripping apparatus 28 is shown in more detail in FIG. 2. Once the product stripping apparatus 28 finishes stripping the rolled product 38 with a core 24, the product stripping apparatus 28 is located at the end of the mandrel 26, which stabilizes the mandrel and the core loading/log stripping apparatus. In addition, the product stripping apparatus 28 helps to properly locate the end point of mandrel 26 for the loading of a core 24.

Figure 14:
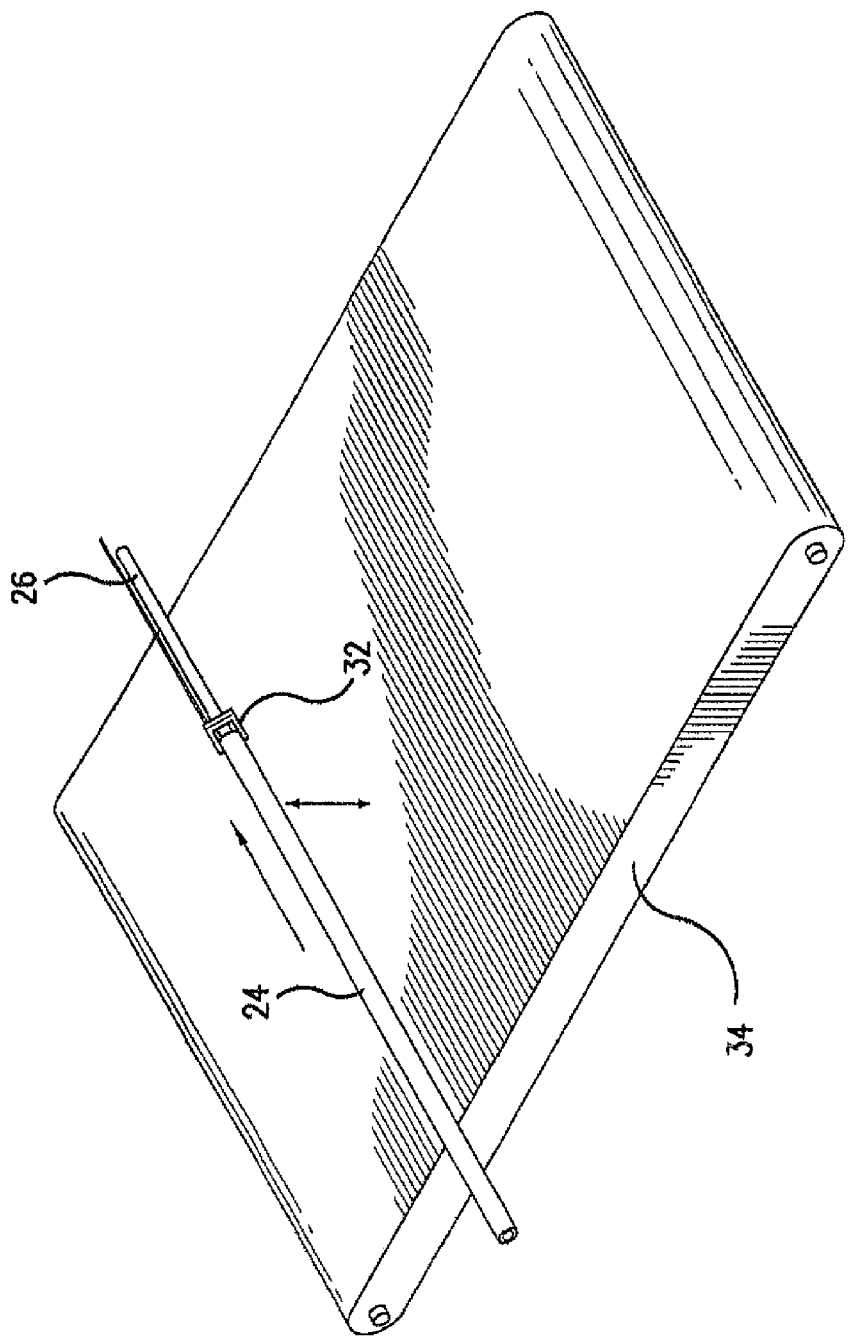
FIG. 14 is a perspective view that shows a core being loaded onto a mandrel via a core loading apparatus.

FIG. 14 shows one embodiment of a core 24 being loaded onto the mandrel 26. The loading of the core 24 is affected by a core loading apparatus 32. The product stripping apparatus may also serve as a core loading apparatus. The core loading apparatus 32 may be simply a frictional engagement between the core loading apparatus 32 and the core 24. However, the core loading apparatus 32 can be configured in other ways known in the art.

FIG. 1 shows an exemplary embodiment of a winder as a "rewinder" 10 with a plurality of independent winding modules 12 arranged in a linear fashion with respect to one another. A frame 14 supports the plurality of independent winding modules 12. A web transport apparatus 34 is present which transports the web 36 for eventual contact with the plurality of independent winding modules 12. The frame 14 comprises a plurality of posts 16 onto which the plurality of independent winding modules 12 are (in this example) slidably engaged and supported. The frame 14 may also be comprised of modular frame sections that would engage each other to form a rigid structure. The number of modular frame sections would coincide with number of winding modules utilized.

Situated adjacent to the frame 14 are a series of core supplying apparatuses 18. A plurality of cores 24 may be included within each core supplying apparatus 18. These cores 24 may be used by the plurality of independent winding modules 12 to form rolled products 22. Once formed, the rolled products 22 may be removed from the plurality of independent winding modules 12 and placed onto a rolled product transport apparatus 20. The rolled product transport apparatus 20 is located proximate to the frame 14 and web transport apparatus 34.

FIG. 2 shows a rewinder 10 as substantially disclosed in FIG. 1 but having the frame 14 and other parts removed for clarity. In this exemplary embodiment, the plurality of independent winding modules 12 are composed of six winding modules 1-6. However, it is to be understood that more or fewer independent winding modules 12 may be used in other embodiments.

Each winding module 1-6 is shown performing a different function. Winding module 1 is shown in the process of loading a core 24 thereon. The plurality of independent winding modules 12 are provided with a core loading apparatus for placing a core 24 onto a mandrel 26 of the plurality of independent winding modules 12. Any number of variations of a core loading apparatus may be utilized. For instance, the core loading apparatus may be a combination of a rod that extends into the core supplying apparatus 18 and pushes a core 24 partially onto the mandrel 26 and a mechanism attached to the linear actuator of the product stripping apparatus 28 that frictionally engages and pulls the core 24 the remaining distance onto the mandrel 26. As shown in FIG. 2, winding module 1 is in the process of pulling a core 24 from the core supplying apparatus 18 and placing the core 24 on mandrel 26.

FIGS. 16-24, show one embodiment of a core loading apparatus. In particular, FIGS. 16-23 illustrate a sequence of loading a core 24 onto a mandrel 26 in order to form a rolled product 22 which is then stripped off the mandrel 26.

The mandrel 26 as shown is supported on one end by a bearing assembly 214. On the opposite end, the mandrel 26 is engagable with a cupping arm 70. The cupping arm 70 is in communication with an actuator (such as a motor) 206. The actuator 206 causes the cupping arm to rotate thereby engaging and disengaging the end of the mandrel 26. For example, in FIG. 20, the cupping arm 70 is shown in the engaged position for supporting the end of the mandrel 26. The cupping arm 70 is used to engage and support the end of the mandrel 26 during winding. When loading the core 24 or when stripping a rolled product from the mandrel 26, on the other hand, the cupping arm 70 disengages the mandrel 26. When the cupping arm 70 is disengaged from the mandrel 26, the stabilizer 204 of the core loading assembly engages the mandrel for supporting the mandrel while a core is being loaded.

The core loading assembly 200 and the actuator 208 can be placed in communication with a controller, such as a microprocessor that is capable of actuating a sequence for loading a core onto the mandrel at a desired position and then stripping a rolled product from the mandrel. As will be noted below, in some embodiments, each independent winding module 12 may be associated with a respective module controller that comprises the microprocessor actuating the loading/stripping sequence. One sequence for loading a core onto the mandrel is illustrated in FIGS. 16-23.

Figure 19:
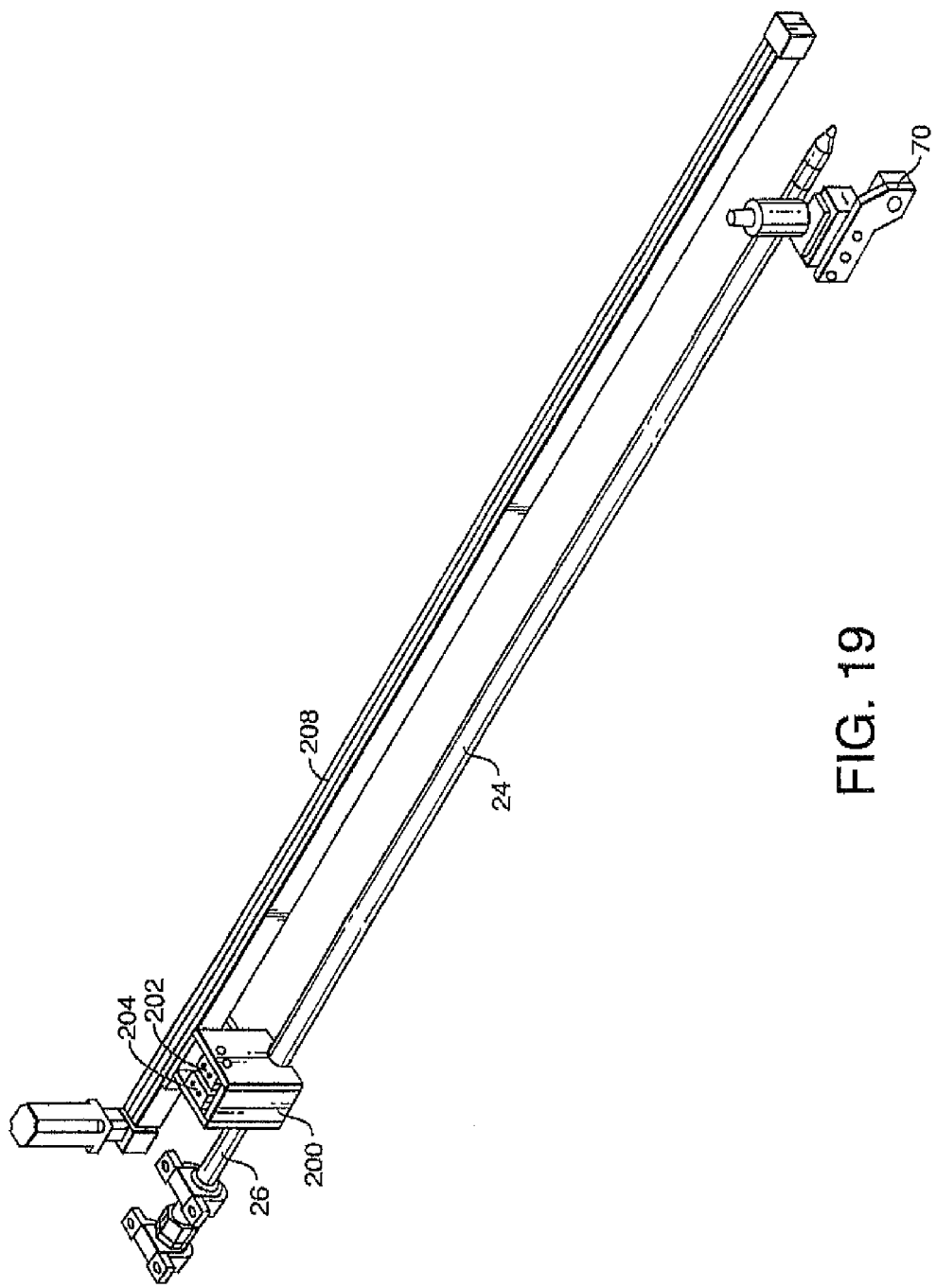
Figure 20:
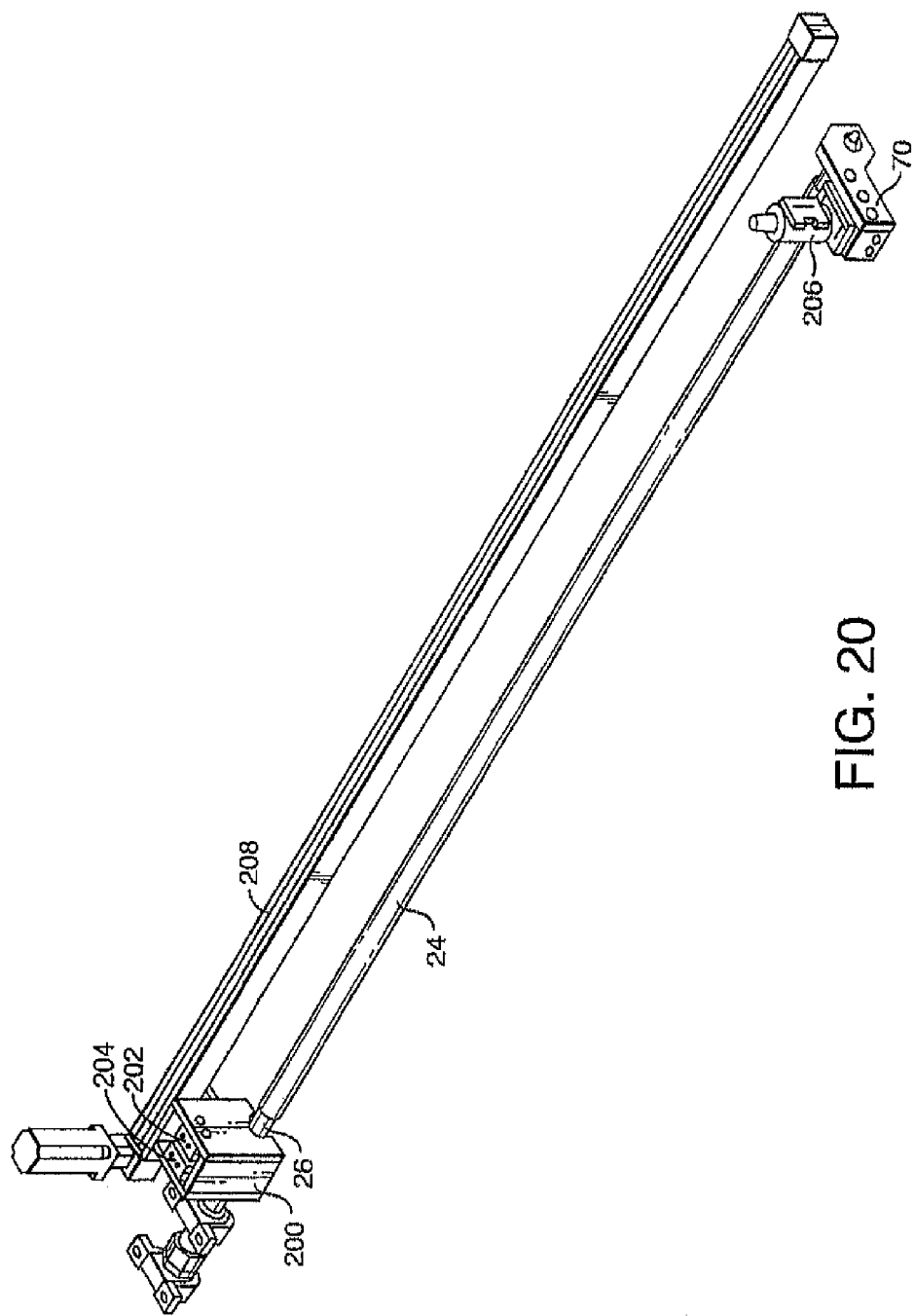

Once the core is engaged, the core 24 is pulled onto the mandrel 26 as shown in FIG. 19 using the actuator 208. The actuator 208 can be configured to place the core 24 at a particular position on the mandrel 26. Once the core 24 is positioned into a particular position, the gripping device 202 can release the core as shown in FIG. 20. The core loading assembly 200 is then moved further to the end of the mandrel to prevent interference with the core 24 as a web of material is wound onto the core. Also, as shown in FIG. 20, the cupping arm 70 is moved back into engagement with the mandrel 26.

Figure 21:
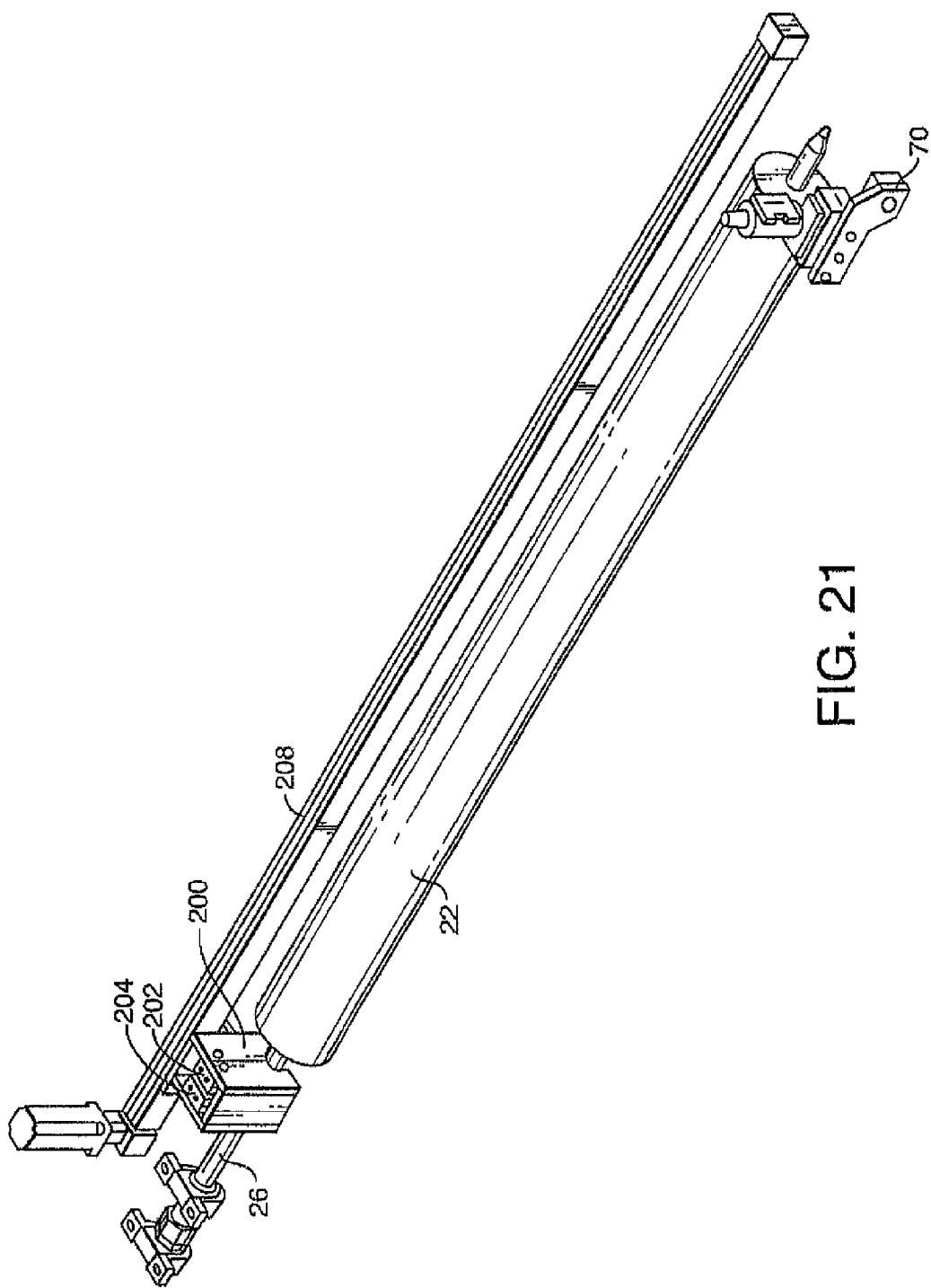
Figure 22:
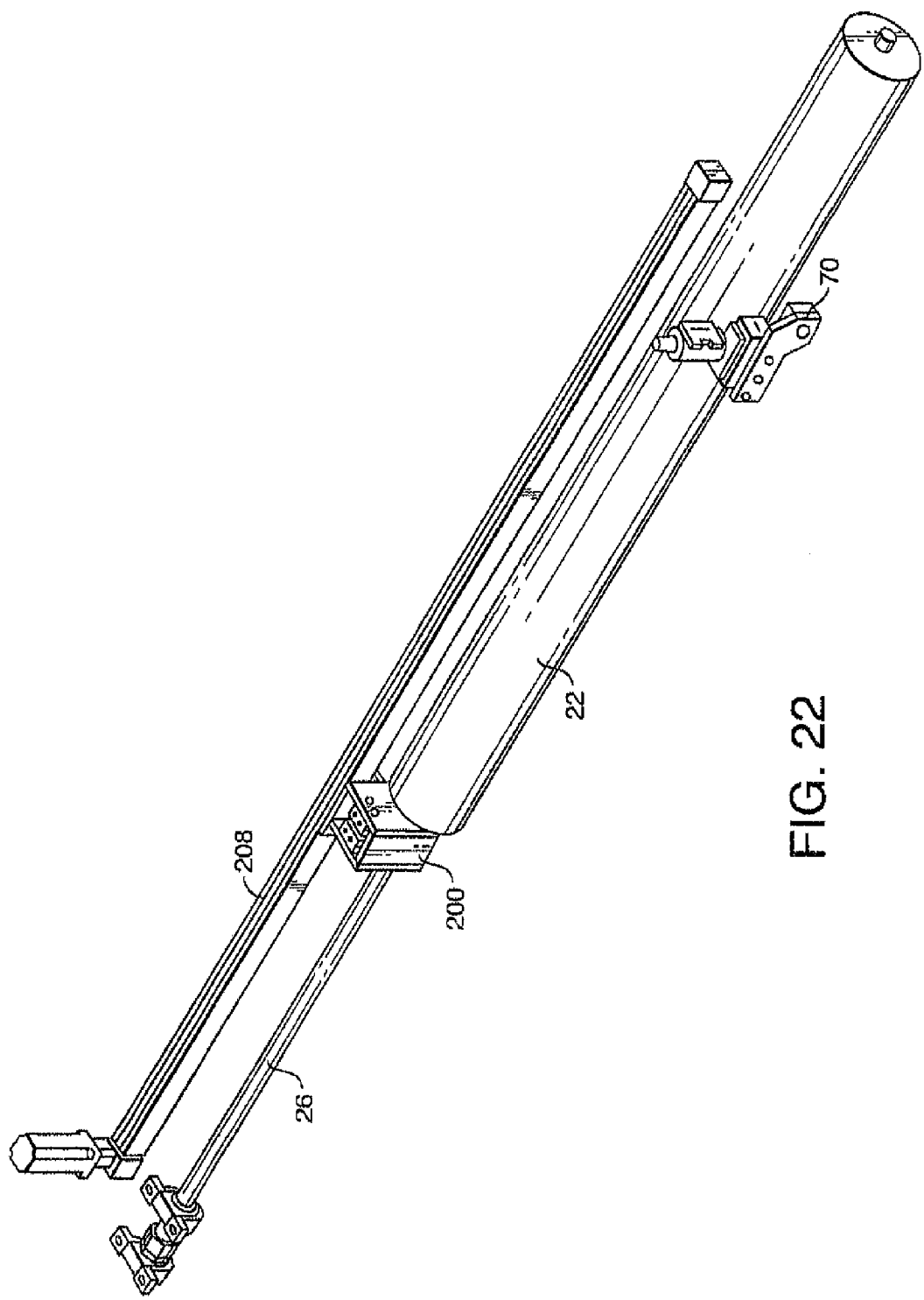
Figure 23:
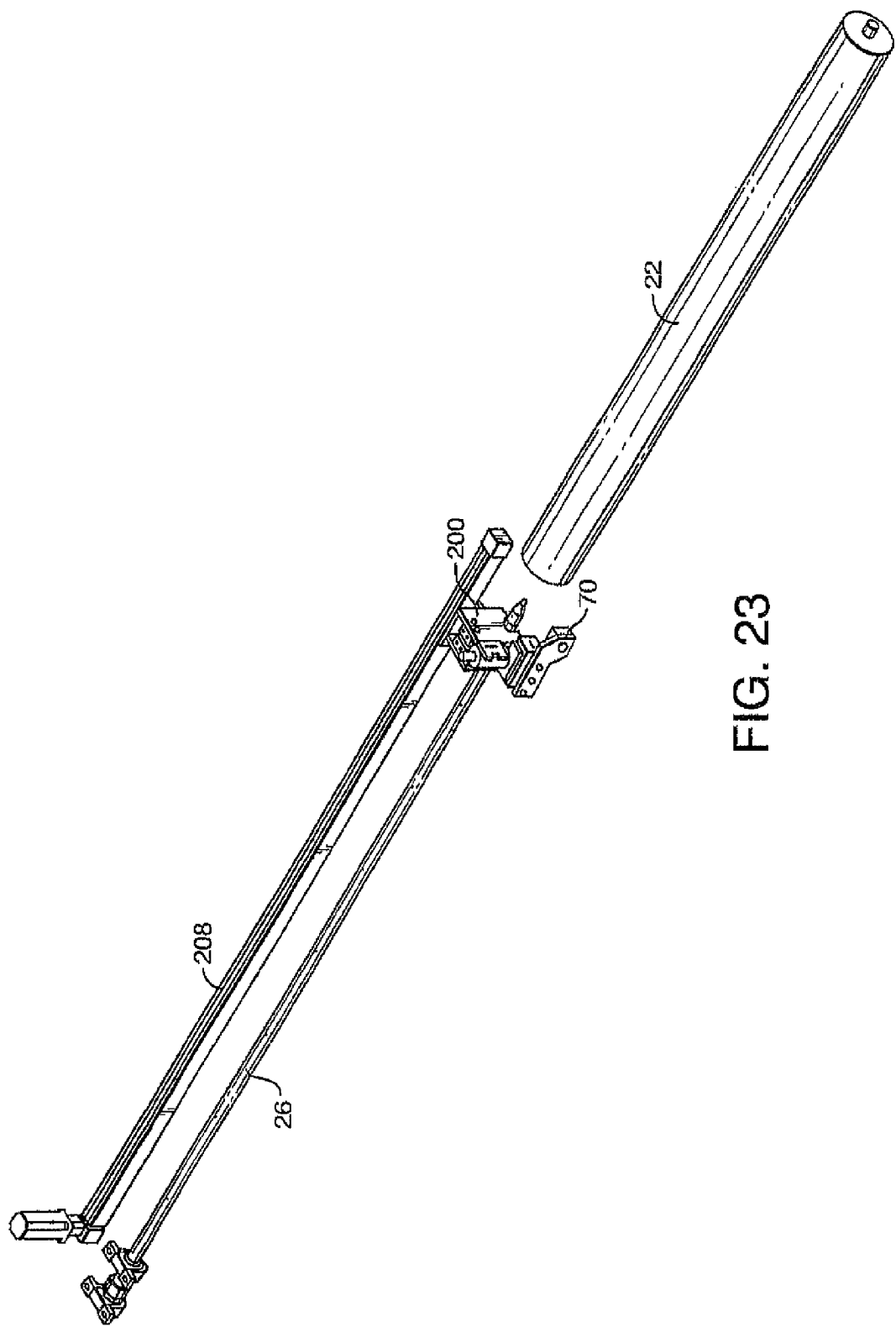
Figure 24:
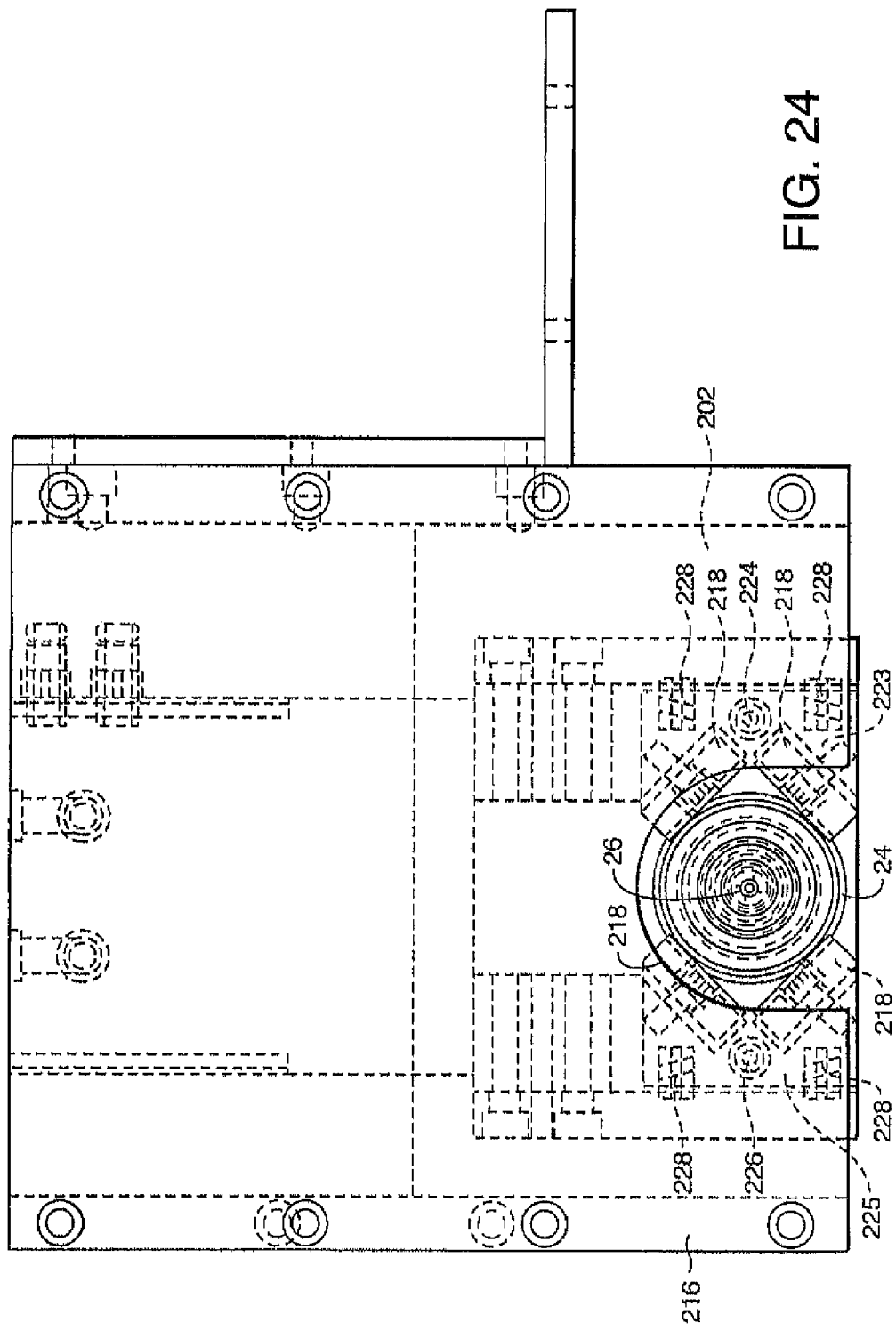
FIG. 24 is a side view of the core loading assembly illustrated in FIGS. 16 through 23.

Once the core 24 is loaded onto the mandrel 26 as shown in FIG. 20, a rolled product 22 is formed on the mandrel as shown in FIG. 21. Of particular advantage, in this embodiment, the core loading assembly 200 can also be used to strip the rolled product 22 from the mandrel 26. For instance, as shown in FIG. 22, once the rolled product 22 is formed, the actuator 208 can move the core loading assembly 200 into engagement with the rolled product for sliding the rolled product off the mandrel 26 as shown in FIG. 23. The rolled product 22 once stripped from the mandrel 26 can then be fed to a rolled product transfer apparatus. Of particular advantage, the core loading assembly 200 stabilizes the mandrel as it pushes the rolled product off of the mandrel. In particular, the core loading assembly 200 holds the open free end of the mandrel which reduces the whip of the mandrel and therefore prevents against misalignments. Further, once the rolled product is stripped from the mandrel, the core loading assembly 200 is in a position for engaging and pulling a new core onto the mandrel.

Referring back to FIG. 2, winding module 2 is shown as having removed the rolled product 22 from its mandrel 26. The rolled product 22 is placed onto a rolled product transport apparatus 20. In this case, the rolled product 22 is a rolled product with a core 38. Such a rolled product with a core 38 is a rolled product 22 that is formed by having the web 36 being spirally wrapped around a core 24. It is to be understood that the rolled product 22 may also be a rolled product that does not have a core 24 and instead is simply a solid roll of wound web 36. It may also be the case that the rolled product 22 does not include a core 24, but has a cavity in the center of the rolled product 22. Various configurations of rolled product 22 may thus be formed.

Winding module 4 is shown as being in the process of winding the web 36 in order to form the rolled product 22. This winding process may be center winding, surface winding, or a combination of center and surface winding. These processes will be explained in greater detail below.

Winding module 5 is shown in a position where it is ready to wind the web 36 once the winding module 4 finishes winding the web 36 to produce a rolled product 22. In other words, winding module 5 is in a "ready to wind" position.

Winding module 6 is shown in FIG. 1 in a "racked out" position. It may be the case that winding module 6 has either faulted or is in need of routine maintenance and is therefore moved substantially out of frame 14 for access by maintenance or operations personnel. As such, winding module 6 is not in a position to wind the web 36 to produce rolled product 22, but the other five winding modules 1-5 are still able to function without interruption to produce the rolled product 22. By acting as individual winders, the plurality of independent winding modules 12 allow for uninterrupted production even when one or more of the winding modules becomes disabled. As will be discussed in further detail below, operation of each winding module may be based on the value of a winding module virtual master signal which can be synchronized to a system virtual master signal as desired. When one or more modules become disabled, the virtual master(s) of the disabled module(s) can be de-synchronized so that the module(s) cease operation while the remaining modules (if any) continue operation.

Figure 4:
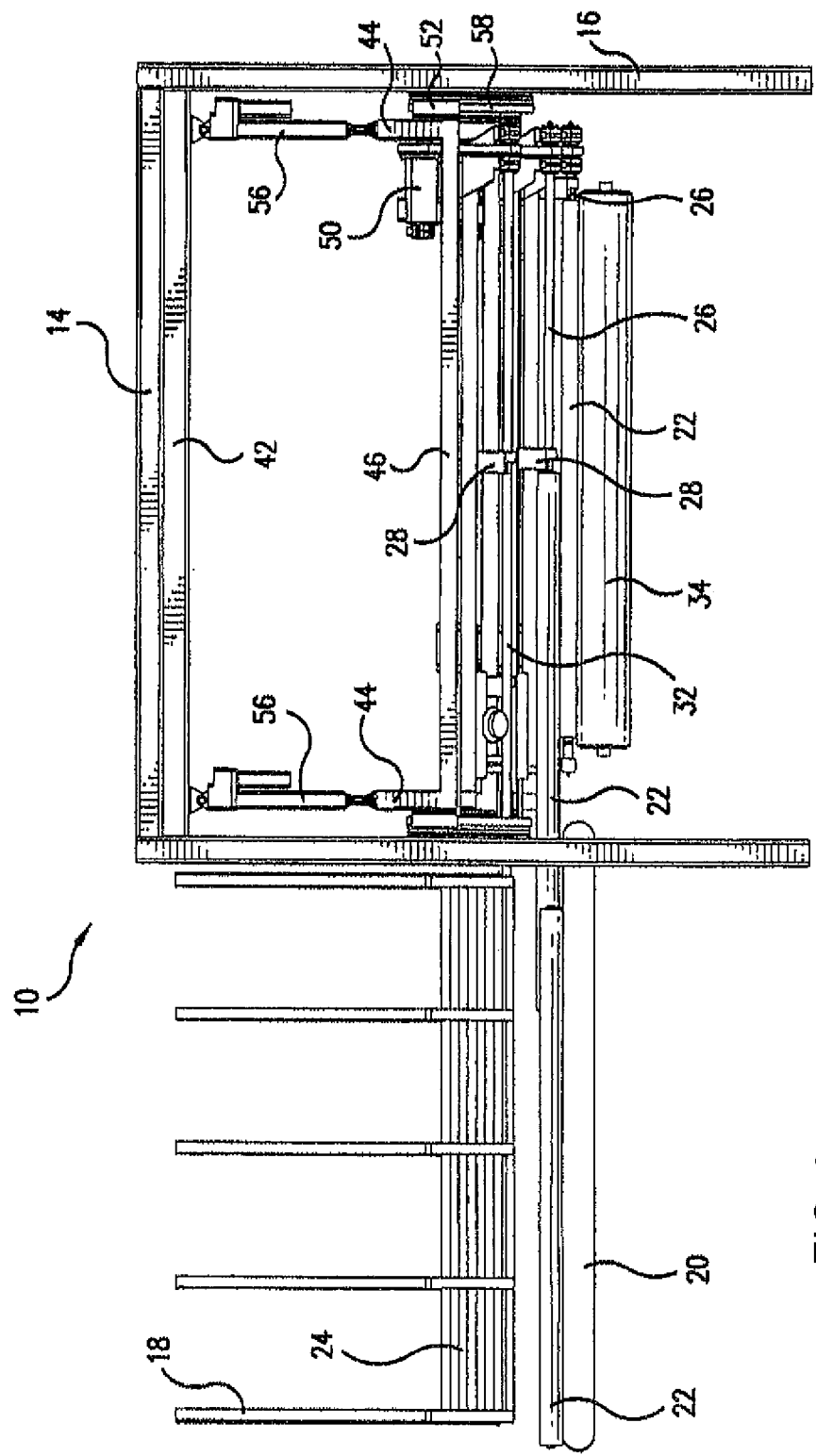
FIG. 4 is a front elevation view of an exemplary embodiment of a winder. The drawing shows a plurality of independent winding modules linearly situated with respect to one another and performing the various functions of a log winding cycle.

Each winding module 12 may have a positioning apparatus 56 (FIG. 4). The positioning apparatus 56 moves the winding module perpendicularly with respect to web transport apparatus 34, and in and out of engagement with web 36. Although the modules 12 are shown as being moved in a substantially vertical direction, other exemplary embodiments of a winder may have the modules 12 moved horizontally or even rotated into position with respect to web 36. Other ways of positioning the modules 12 can be envisioned.

Therefore, each of the plurality of independent winding modules 12 may be a self-contained unit and may perform the functions as described with respect to the winding modules 1-6. Winding module 1 may load a core 24 onto the mandrel 26 if a core 24 is desired for the particular rolled product 22 being produced. Next, the winding module 1 may be linearly positioned so as to be in a "ready to wind" position. Further, the mandrel 26 may be rotated to a desired rotational speed and then positioned by the positioning apparatus 56 in order to initiate contact with the web 36. The rotational speed of the mandrel 26 and the position of the winding module 1 with respect to the web 36 may be controlled during the building of the rolled product 22. After completion of the wind, the position of the module 1 with respect to the web 36 will be varied so that the winding module 1 is in a position to effect removal of the rolled product 22. The rolled product 22 may be removed by the product stripping apparatus 28 such that the rolled product 22 is placed on the rolled product transport apparatus 20. Finally, the winding module 1 may be positioned such that it is capable of loading a core 24 onto the mandrel 26 if so desired. Again, if a coreless rolled product were to be produced as the rolled product 22, the step of loading a core 24 would be skipped. It is to be understood that other exemplary embodiments, the core 24 loading operation and the roiled product 22 stripping operation occur in the same or different positions with regard to the mandrel 26.

The plurality of independent winding modules 12 may be adjusted in order to accommodate for the building of the rolled product 22. For instance, if surface winding were desired, the pressure between the rolled product 22 as it is being built and the web transport apparatus 34 may be adjusted by the use of the positioning apparatus 56 during the building of the rolled product 22.

Utilizing a plurality of independent winding modules 12 allows for a rewinder 10 that is capable of simultaneously producing rolled product 22 having varying attributes. For instance, the rolled products 22 that are produced may be made such that they have different sheet counts. Also, the rewinder 10 can be run at both high and low cycle rates with the modules 12 being set up in the most efficient manner for the rolled product 22 being built. In order to use asynchronous control principles discussed herein, as noted above, the winding modules 12 may have winding controls specific to each module 12, with a common machine control. Real time changes may be made where different types of rolled products 22 are produced without having to significantly modify or stop the rewinder 10. Real time roll attributes can be measured and controlled, and in some embodiments, operation is not limited to the cycle rate.

A winder may be capable of producing a wide spectrum of rolled products 22, and is not limited towards a specific width of the web 36. Also, the plurality of independent winding modules 12 can be designed in such a way that maintenance may be performed on any one or more of the winding modules 1-6 without having to interrupt operation, as previously discussed with winding module 6. A winding module 12 may be removed and worked on while the rest keep running. Further, having a plurality of independent winding modules 12 allows for an increase in the time intervals available for the core 24 loading functions and the rolled product 22 stripping functions.

For example, as will be discussed below, the time intervals may be increased by implementing the core loading and rolled product stripping functions as timed operations that are not synchronized to a master count value. Allowing for an increase in these time intervals greatly reduces the occurrence of loading and stripping errors. Also, prior art apparatuses experiencing interruption of the winding operation will oftentimes produce a rolled product 22 that is not complete. This waste along with the waste created by the changing of a parent roll or product format change will be reduced as a result of the rewinder 10 using asynchronous control principles. Waste may be removed from the rewinder 10 by use of a waste removal apparatus 200 (FIG. 5) as is known in the art.

Figure 3:
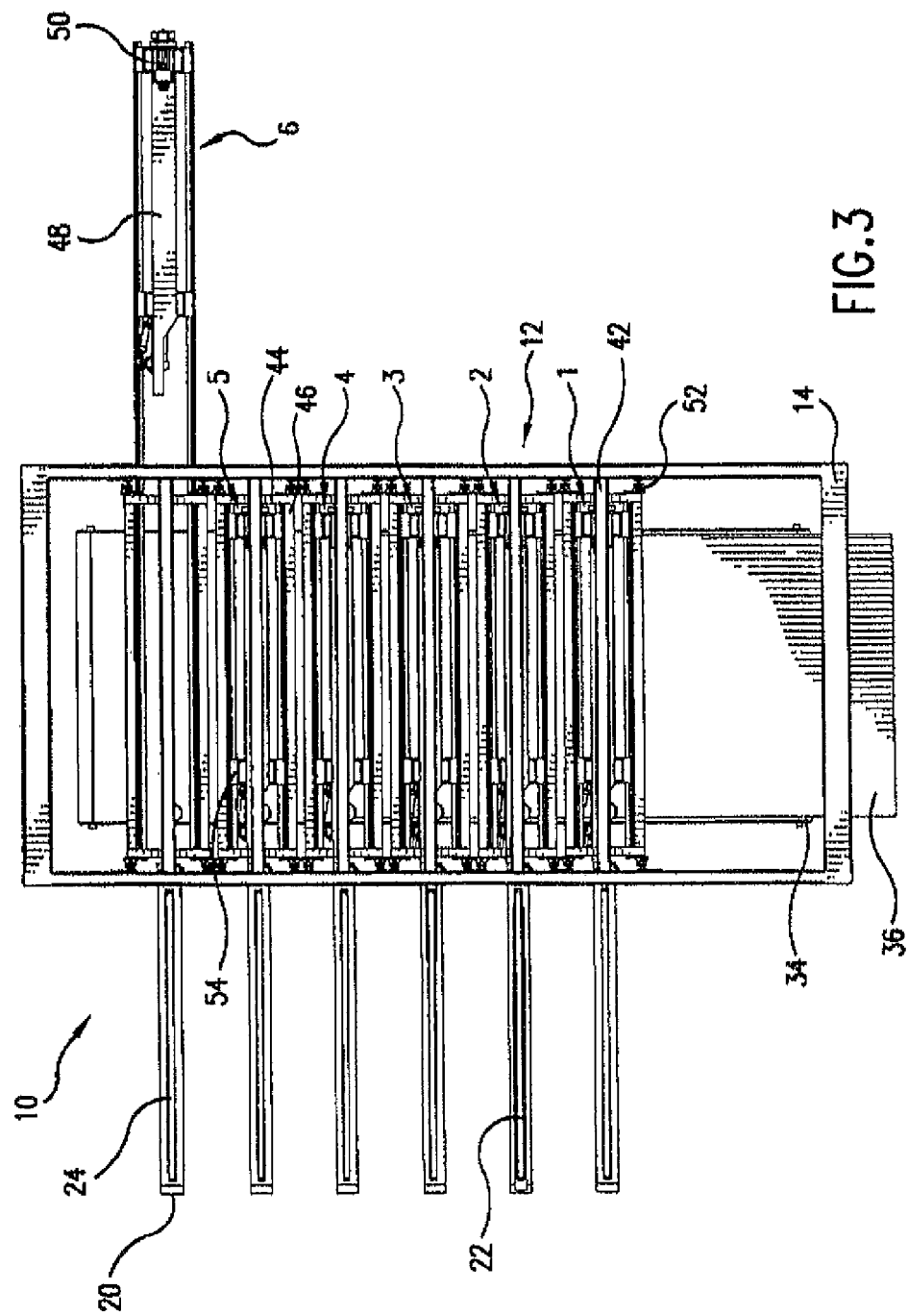
FIG. 3 is a plan view of an exemplary embodiment of a winder. The drawing shows a plurality of independent winding modules linearly situated with respect to one another and performing the various functions of a log winding cycle.

FIG. 3 shows a rewinder 10 having a frame 14 disposed about a plurality of independent winding modules 12. The positioning apparatus 56 that communicates with the winding modules 1-6 is engaged on one end to the cross members 42, as shown in FIG. 4. A vertical linear support member 44 is present on the plurality of independent winding modules 12 in order to provide an attachment mechanism for the positioning apparatus 56 and to provide for stability of the winding modules. The positioning apparatus 56 may be a driven roller screw actuator. However, other means of positioning the plurality of independent winding modules 12 may be utilized. A horizontal linear support member 46 is also present in the plurality of independent winding modules 12. The horizontal linear support member 46 may communicate with a horizontal linear slide 54 (as shown in FIG. 6) to allow some or all of the plurality of independent winding modules 12 to be moved outside of the frame 14.

Figure 6:
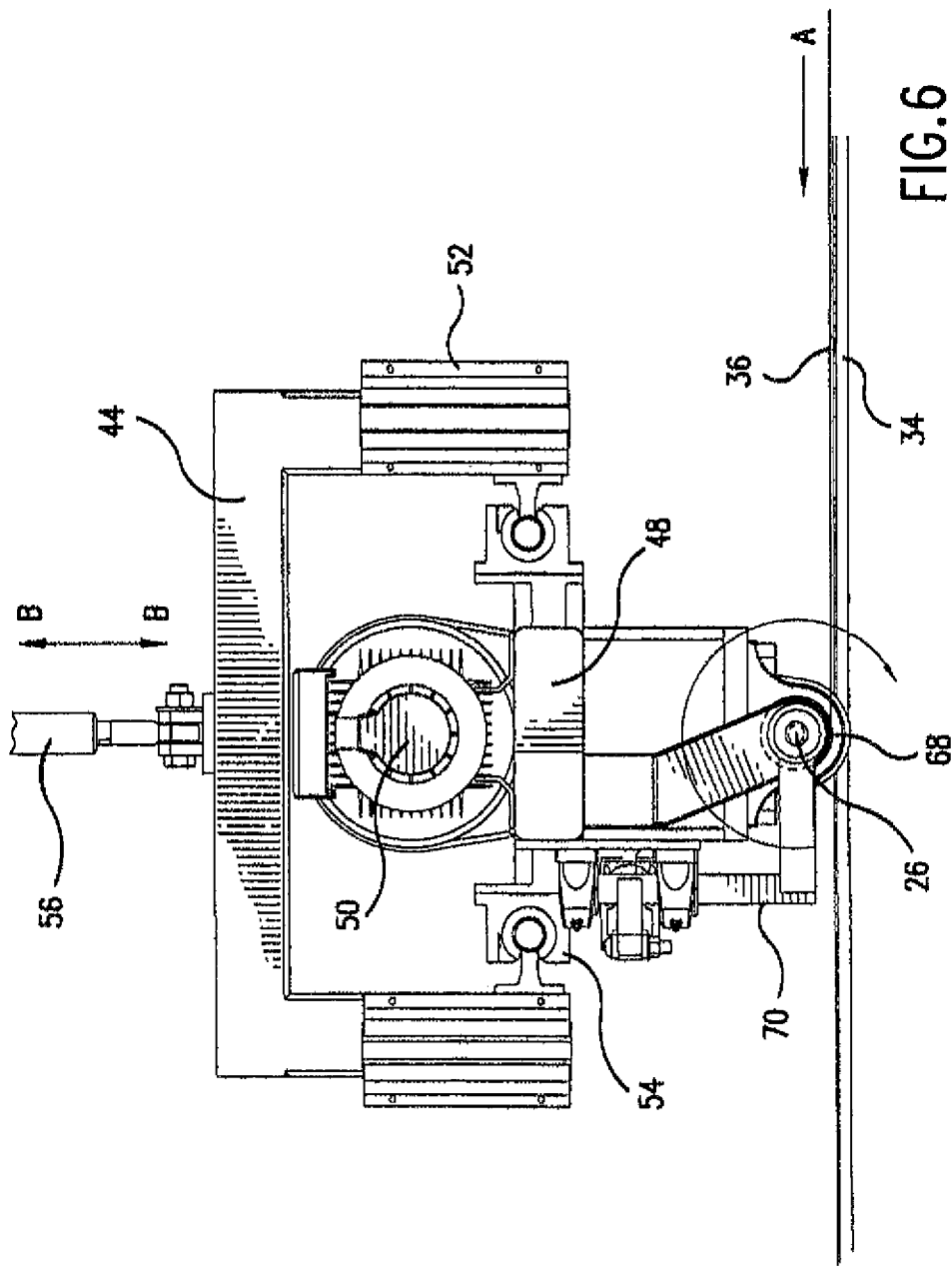
FIG. 6 is a side elevation view of an exemplary embodiment of an independent winding module. The drawing shows the winding module engaging a web and forming a rolled product via center and surface winding.
Figure 7:
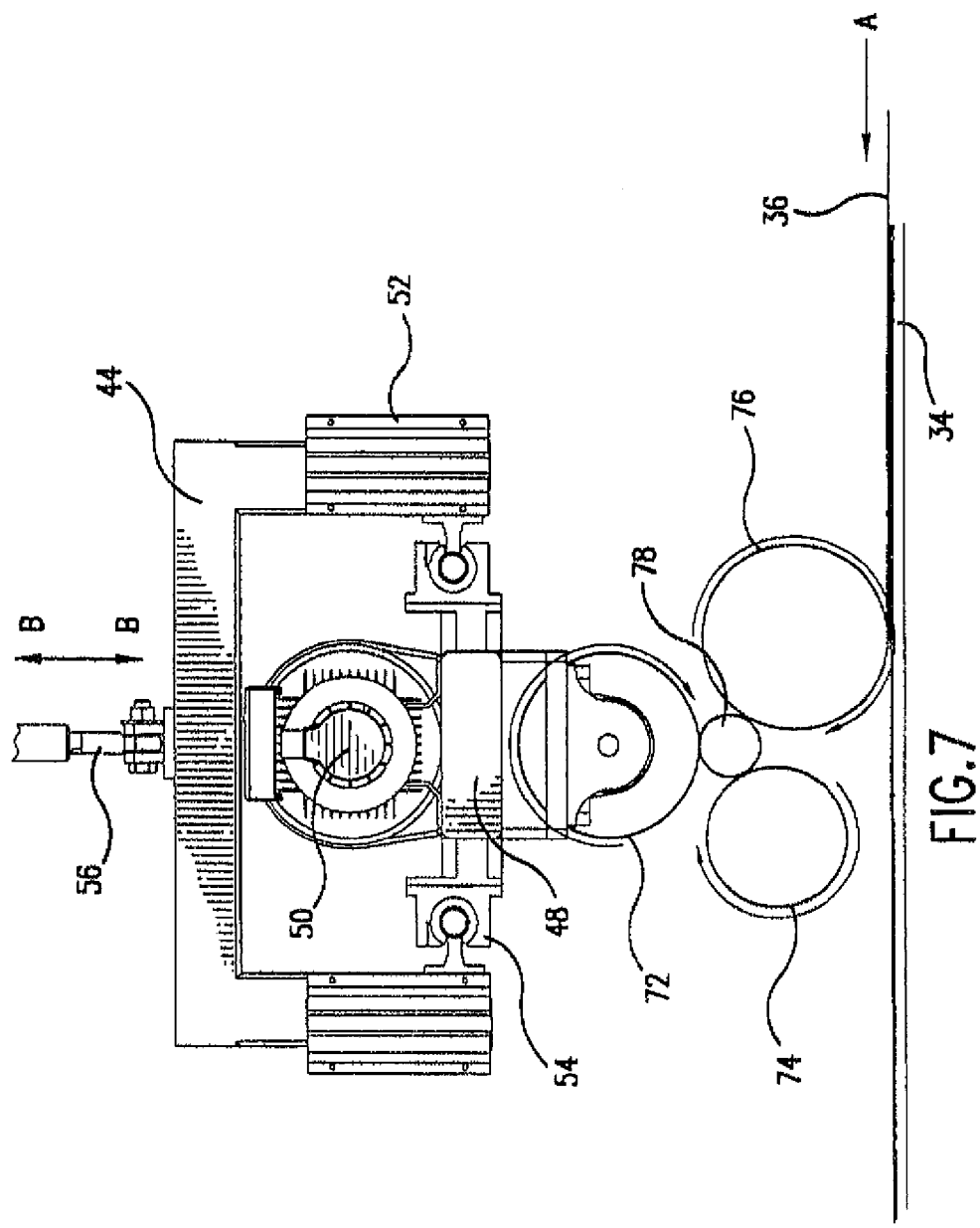
FIG. 7 is a side elevation view of an exemplary embodiment of a winding module. The drawing shows the winding module using rolls to form a rolled product via surface winding only.

FIG. 6 shows a close up view of an exemplary embodiment of a winding module. The servomotor 50 can be supported by the module frame 48 onto which a mandrel cupping arm 70 is configured. As can be seen, the positioning apparatus 56 may move the winding module for engagement onto the web 36 as the web 36 is transported by the web transport apparatus 34. Doing so will produce a nip 68 at the point of contact between the mandrel 26 and the transport apparatus 34, with the web 36 thereafter being wound onto the mandrel 26 to produce a rolled product 22.

It will be understood that each module can have a different physical configuration and may wind using different principles. For instance, in the same machine, one module may comprise a surface winder, another module may use core winding, and another module may use a vacuum mandrel. Additionally, production of a rolled product 22 having a core 24 or a careless cavity in the rolled product 22 can be achieved in any other suitable fashion.

The plurality of winding modules 12 may also be modified such that additional improvements are realized. For instance, a tail sealing apparatus 30 may be included on the plurality of independent winding modules 12. As shown in FIG. 2, the tail sealing apparatus 30 is located on the underside of the plate 48. The tail sealing apparatus 30 may be a series of holes from which an adhesive is sprayed onto the rolled product 22 as the final lengths of the web 36 are wound onto the rolled product 22. The adhesive causes the tailing end of the web 36 to be adhered to the rolled product 22. It is therefore possible to seal the tail of the rolled product 22 before being unloaded to the rolled product transport apparatus 20. Of course, it may also be possible to provide adhesive to the web 36 at a point other than at the plurality of independent winding modules 12. As stated, for example, adhesive may be applied by the tail sealing module 62 as shown in FIG. 5. Also, it may also be the case that sealing of the tail of the web 36 onto the rolled product 22 may be done offline, beyond the winder.

In order to get the web 36 onto the mandrel 26, the mandrel 26 as shown in FIG. 6, may be a vacuum supplied mandrel. Such a vacuum mandrel 26 will pull the web 36 onto the mandrel 26 by means of a vacuum supplied through all or parts of the vacuum mandrel 26. Other ways of assisting the transfer of the web 36 onto the mandrel 26 are also possible. For instance, an air blast may be provided under the surface of the web transport apparatus 34 or a camming apparatus may be placed under the web transport apparatus 34 to propel the web 36 into contact with the mandrel 26. Further, the positioning apparatus 56 may be used to push the winding module down onto the web 36 to effect the winding. Again, the rewinder 10 is thus capable of producing a rolled product 22 which has a core, which is solid without a core or cavity therethrough, or which does not have a core but does have a cavity therethrough. Such a rolled product 22 that is produced without a core 24, yet having a cavity therethrough could be produced by using a vacuum supplied mandrel 26.

FIG. 5 shows an exemplary embodiment of a rewinder 10 that makes use of several modules upstream from the plurality of independent winding modules 12. For instance, a cut-off module 60 is utilized that severs the web 36 once a desired amount of web 36 is transported for the production of a rolled product 22. This severing creates a new leading edge for the next available winding module 1-6 to engage. However, it is to be understood that a cut-off module 60 may be utilized at locations immediately adjacent to or at the nip 68 of the plurality of independent winding modules 12. Also, FIG. 5 shows an adhesive application module 62 on the web transport apparatus 34 for applying adhesive or an adhesive tape onto the web 36. A perforation module 64 is also provided in order to perforate the web 36.

One particular embodiment of a cut-off module 60 that is particularly well suited to breaking the web 36 while moving is shown in FIG. 15. In particular, the cut-off module 60 as illustrated in FIG. 15 can form a break in the web 36 without having to stop or decelerate the web during the winding process.

As shown, the cut-off module 60 includes a rotating roll 300, such as a vacuum roll that rotates with the web 36 and defines a conveying surface 302. In this embodiment, the vacuum roll 300 is placed adjacent to a guide roll 304 which can receive the web 36 from a parent roll or directly from a papermaking process. Not shown is a perforation module 64. The web 36, however, can be perforated as it is unwound or can be pre-perforated Also shown in FIG. 5 is a waste removal apparatus 200 for removing extra web 36 that results from faults such, as web breaks, and machine start ups. This waste is moved to the end of the web transfer apparatus 34 and then removed. The asynchronous control of a plurality of individual modules 12 reduces the amount of waste because once a fault is detected, the affected module 12 can be shut down before the rolled product is completely wound. The web may then be severed on the fly and a new leading edge transferred to the next available module. Any waste is moved to the end of the web transfer apparatus 34 and then removed.

As was noted above, through use of asynchronous control, each of the winder modules 1-6 of the plurality of independent winding modules 12 do not rely on the successful operation of any of the other modules 1-6. This allows the rewinder 10 to operate whenever commonly occurring problems during the winding process arise. Such problems could include for instance web breaks, ballooned rolls, missed transfers, and core loading errors. The rewinder 10 therefore will not have to shut down whenever one or more of these problems occurs because the winding modules 1-6 can be programmed to sense a problem and work around the particular problem without shutting down. For instance, if a web break problem occurs, the rewinder 10 may perform a web cut by a cut-off module 60 and then initiate a new transfer sequence in order to start a new winding about the next available winding module 1-6.

For example, the module that is winding when the web breaks can discontinue operation, either due to its own detection of a fault or in response to a command from a machine central controller. Simultaneously or shortly thereafter, the machine central controller can determine the next available point of engagement for the web based on the timing of the web cut and known data regarding the minimum lead time (expressed as count values) for a "ready" module to engage the web. A ready module could be commanded to engage its virtual master at an appropriate system master count so as to begin operation at the newly-cut edge. Depending on the lead time, the web may be cut again to provide a leading edge to be engaged by the winding module. Of course, in other embodiments, the module could engage the web at a point other than an edge, depending on the type of winding that is used.

Any portion of the web 36 that was not wound would travel to the end of the web transport apparatus 34 where a waste removal apparatus 200 could be used to remove and transport the waste to a location remote from the rewinder 10. The waste removal apparatus 200 could be for instance an air conveying system. The winding module 1-6 whose winding cycle was interrupted due to the web break could then be positioned accordingly and initiate removal of the improperly formed rolled product 22. Subsequently, the winding module 1-6 could resume normal operation. During this entire time, the rewinder 10 would not have to shut down. Instead, the operational sequence could be modified to proceed without the faulted module. Once the fault is cleared, the module could be returned to "ready" status and then included in the operational sequence at any suitable point (if needed).

Another exemplary embodiment of winding involves the use of a slit web. Here, the web 36 is cut one or more times in the machine direction and each slit section is routed to a plurality of winding modules 12. It is therefore possible to wind the web 36 by two or more modules 12 at the same time.

In some embodiments, the winding process can be performed at an end of a tissue machine. In this way, the tissue web 36 could be directly converted to product sized rolls 22 which in turn would bypass the need to first wind a parent roll during the manufacturing and subsequent rewinding process.

The plurality of independent winding modules 12 of FIG. 5 are arranged in a substantially linear direction. In addition, the web transport apparatus 34 is also linear in orientation at the location proximate to the plurality of independent winding modules 12. The embodiments depicted are of an orientation of the web transport device in a substantially horizontal plane. However, it should be realized that any orientation other than horizontal could be utilized. Furthermore, the embodiments depicted utilize modules that only engage one side of the web transport apparatus. It should be understood that a winder could be configured where the winding modules engage more than one side of the web transport apparatus.

Figure 8:
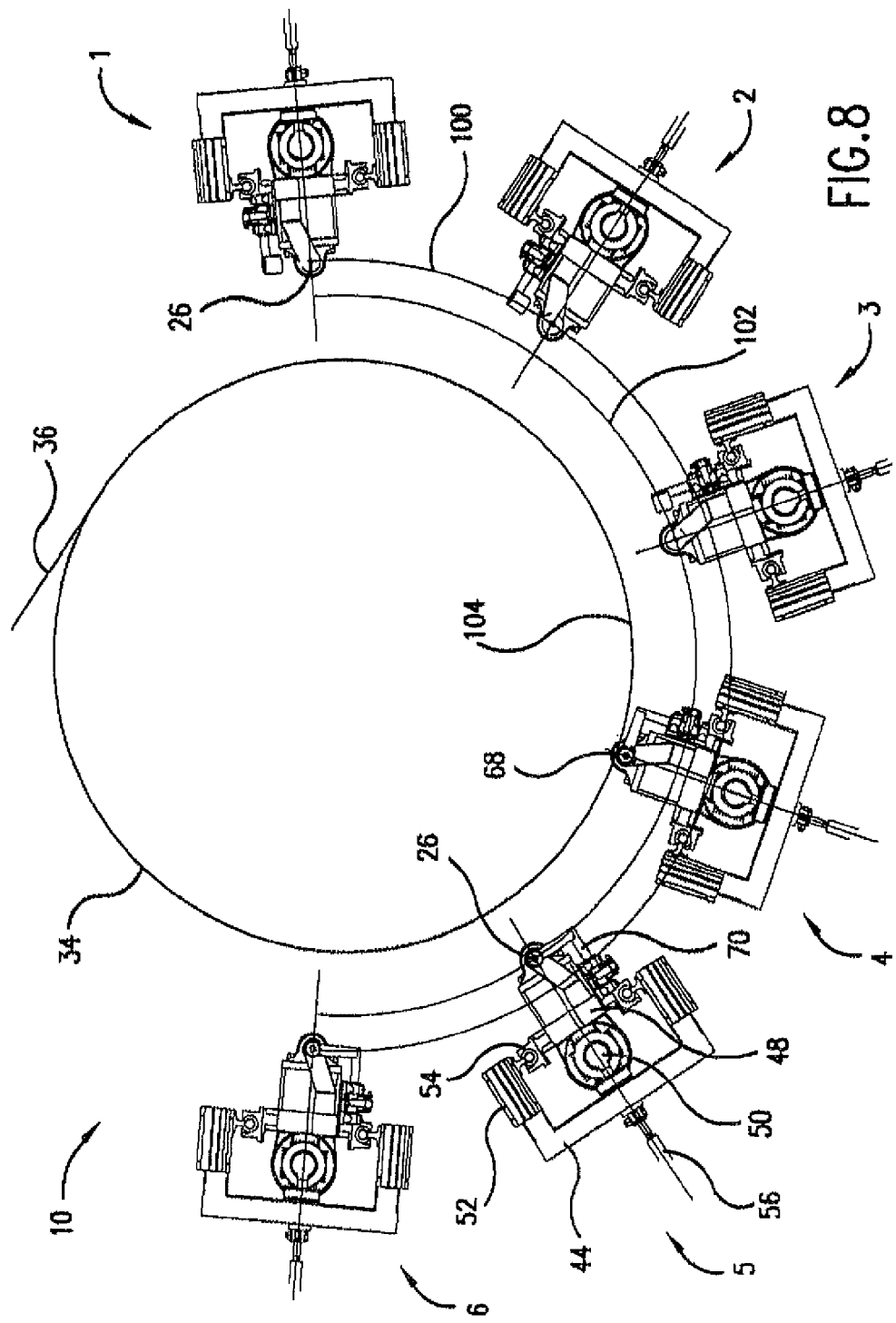
FIG. 8 is a side elevation of an exemplary embodiment of a winder. The drawing shows a plurality of independent winding modules being radially situated with respect to one another and interacting with a circular web transport apparatus.

FIG. 8 shows an alternative configuration of both the web transport apparatus 34 and the plurality of independent winding modules 12. The exemplary embodiment shown in FIG. 8 is a plurality of winding modules 12 that are radially disposed with respect to one another, and a web transport apparatus 34 that is cylindrical in shape. The web transport apparatus 34 in this case can be, for instance, a vacuum roll. Each of the winding modules 1-6 are arranged about the web transport apparatus 34 such that the winding modules 1-6 are moved towards and away from the web transport apparatus 34 by the positioning apparatus 56.

Figure 9:
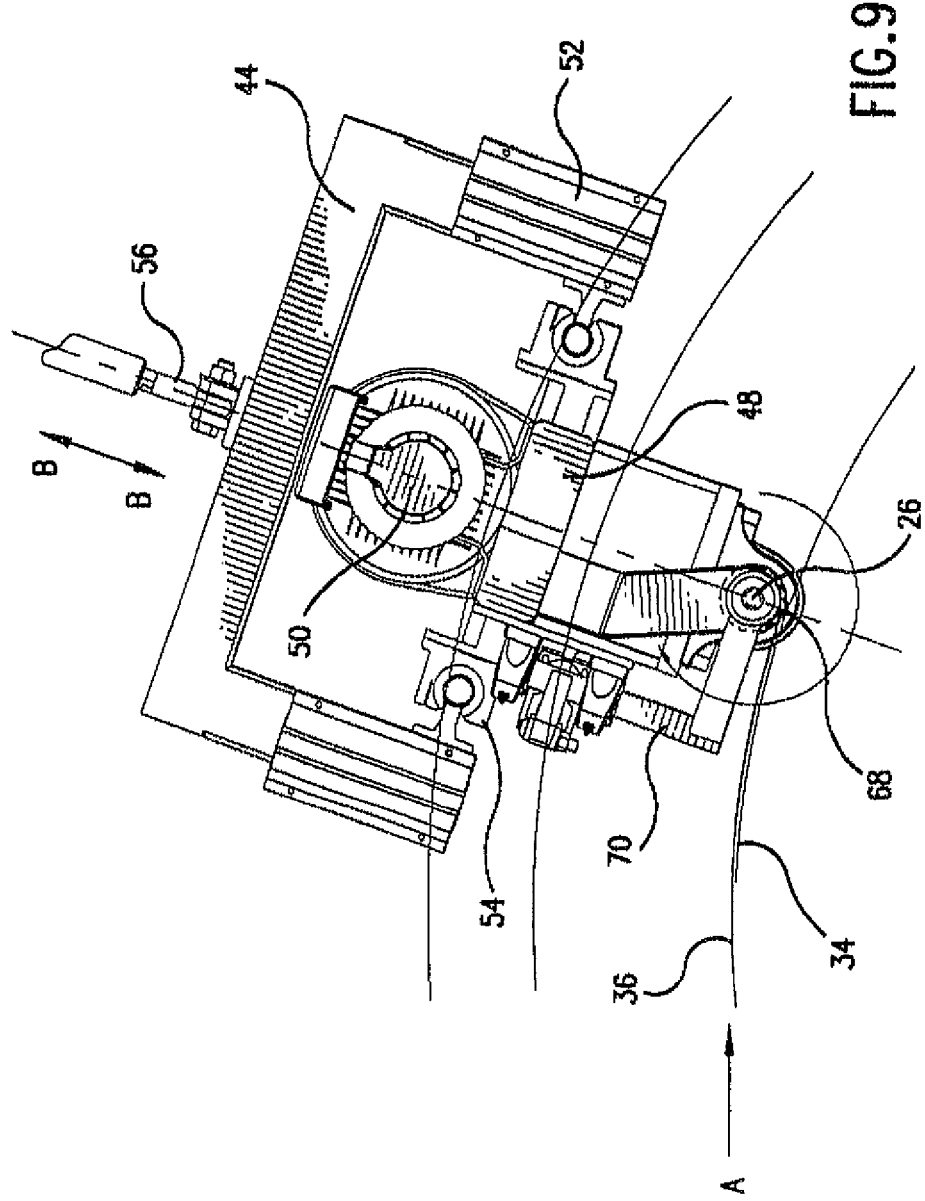
FIG. 9 is a side elevation view of an exemplary embodiment of an independent winding module. The drawing shows a winding module that interacts with a circular web transport apparatus.

FIG. 9 discloses an exemplary embodiment of a winding module that is used in the configuration disclosed in FIG. 8. The winding module of FIG. 9 is substantially the same as the winding module shown in FIG. 6, although configured for a circular array configuration as opposed to a linear array configuration.

II. General Principles of Asynchronous Control

As was discussed above, a winder/rewinder can comprise a plurality of independent modules. Winding (and other) controls may be configured specifically for each module in a manner so that modules do not necessarily rely on successful operation of other modules. In some embodiments, this may be achieved through use of a distributed control system that allows for asynchronous control of the various modules in the system. Although some of the following examples discussed later below relate to a modular winder/rewinder, it will be appreciated that the control principles may be applicable to any type of machine or tool comprising a plurality of modules configurable for independent operation.

Figure 25:
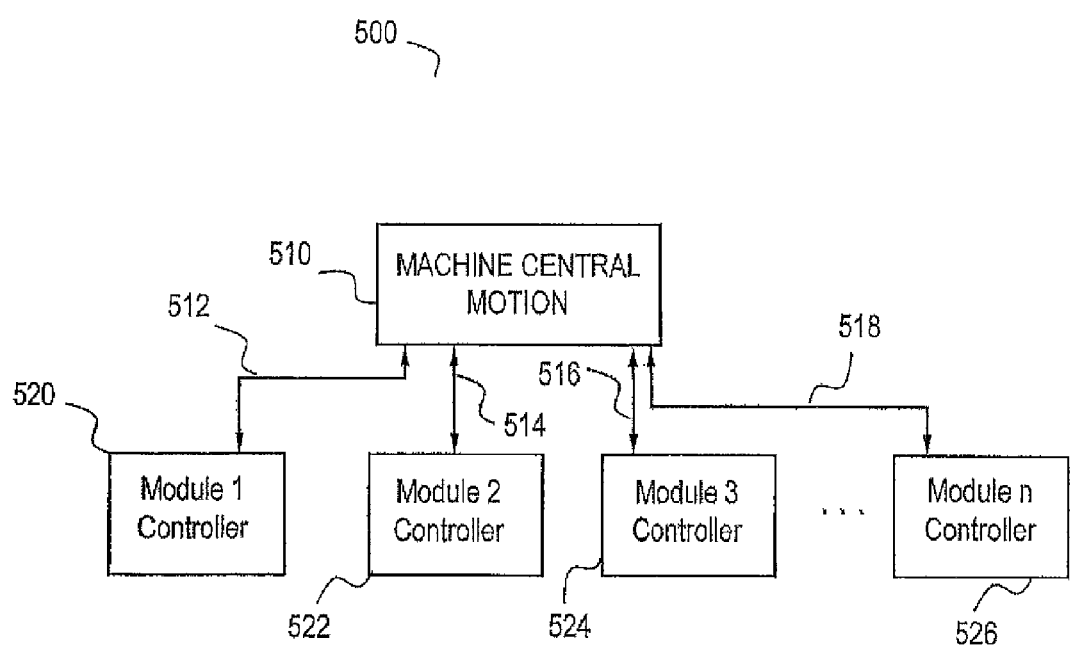
FIG. 25 is a block diagram illustrating an exemplary hardware architecture for implementing an asynchronous control system.

FIG. 25 is a block diagram illustrating an exemplary hardware architecture 500 for implementing an asynchronous control system. Machine central motion controller 510 is linked to controllers for various modules comprising the machine. In this example, machine central motion controller 510 is linked to module 1 controller 520, module 2 controller 522, module 3 controller 524, and module n controller 526. Although four module controllers are shown in FIG. 25, it will be understood that more or fewer module controllers can be used depending on the particular machine and control system implementation. For example, in a machine comprising six winding modules 12, the hardware architecture could comprise six respective winding module controllers, along with one or more other module controllers for cut-off, adhesive application, and perforation. Returning to the example of FIG. 25, machine central motion controller 510 and module controllers 520, 522, 524, and 526 may each comprise any suitable type or arrangement of computing devices, such as general-purpose computers, specialized microprocessor-based hardware controllers, and the like. In some embodiments, some or all of aspects of the module controllers and/or central motion controller may be implemented as separate logical units using the same computing device or devices. Some aspects of the control system may be implemented by software or specialized hardware (such as application-specific integrated circuits).

Generally speaking, connections 512, 514, 516, and 518 may comprise any suitable type or combination of types of data connections. For instance, the connections may comprise Ethernet connections, control net connections, and/or any other suitable connection types. Furthermore, in this example, individual links are shown between central motion controller 510 and each module. However, in other embodiments, the modules and central motion controller 510 are connected to a network and/or to one another via peer connections.

In operation, machine central motion controller 510 sends commands and inquiries to the various module controllers to implement a sequence of operation for the machine and receives status data from the modules. For example, if the various module controllers correspond to parts of a winder/rewinder, then central motion controller 510 can send commands to winding and cutting modules to cut material and carry out winding operations. If one or more modules provide a message indicating a fault, machine central motion controller 510 can adjust operation of the machine to address the fault and attempt to continue operation.

Regardless of the underlying hardware architecture, machine control can be distributed for asynchronous operation by using at least a system master and one sub-system virtual master, with at least some machine components synchronized to the sub-system virtual master. For instance, in some embodiments, a control system for a modular machine can provide, produce, or otherwise generate a system virtual master and at least one module virtual master, with module components synchronized directly or indirectly to the module virtual master. Machine central motion controller 510 can provide a signal representing the system virtual master and commands to one or more module controllers. Central motion controller 510 can access one or more control programs that define one or more sequences of operation. Based on the sequences of operation, central motion controller can calculate required timings and send commands to the module controller(s) to properly synchronize the module virtual master (s) to respective given points on the system virtual master to implement the desired operations. Moreover, the given point for each module can change between system virtual master operational cycles while the other portions of the machine or system remain in motion.

Figure 26:
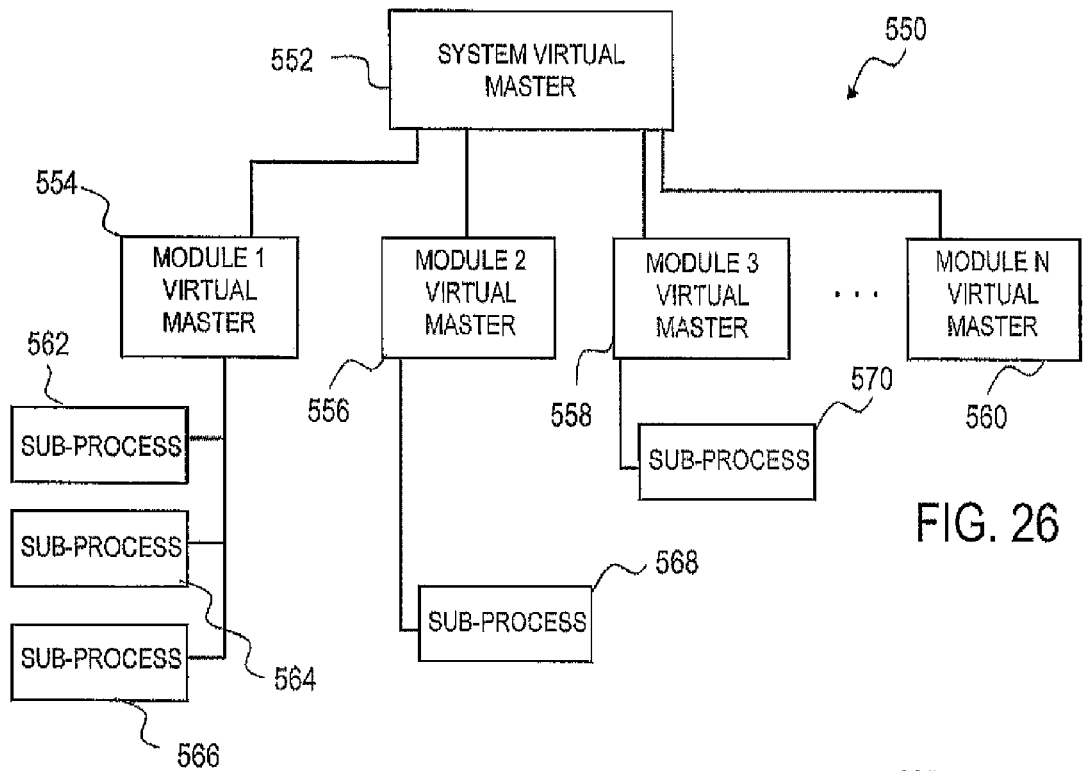
FIG. 26 is a block diagram of the overall control system architecture of an exemplary, generalized, embodiment of a distributed asynchronous control system.

FIG. 26 illustrates a block diagram of the overall control system architecture of an exemplary embodiment of a distributed asynchronous control system for components of, for example, a machine, in a generalized form. Block 552 represents the system master. For instance, block 552 may represent a system virtual master or system master signal provided by a central motion controller. Alternatively, in some embodiments, the system master may comprise a master signal, such as an encoder generated based on a physical master axis. The control system further comprises additional virtual masters 554, 556, 558, and 560 each corresponding to a respective module 1, 2, 3, and n. For instance, the module virtual master signals may be provided by respective module controllers.

Although four virtual masters corresponding to four modules are explicitly identified and discussed, the reference to module n is meant to indicate that the control system may comprise many more modules and the present subject matter is not intended to be limited by the number of modules. Of course, a control system could comprise fewer modules, as well. Additionally, in some embodiments, a module may comprise components that are synchronized to one or more sub-process virtual masters, with each sub-process virtual master synchronized to the module virtual master.

As was noted above, some machine components may be synchronized to the system master directly in a conventional manner. However, such components (for example, a machine conveyor) are not addressed in detail herein.

Each module can comprise components used in one or more sub-systems/sub-processes, and each module may be configured to perform one or more actions, steps, or other activities involved in the task(s) and/or function(s) performed by the machine. Module controllers may provide one or more signals or indicators that cause the components to perform as desired, such as by sending electrical, hydraulic, or other signals.

A generalized arrangement of sub-processes carried out by a machine are shown in FIG. 26 as sub-processes 562, 564, 566, which are associated with module 1, sub-process 568, which is associated with module 2, and at sub process 570 which is associated with module 3. For example, as noted above, a winder/rewinder may comprise modules configured to perform tasks including loading cores, positioning a mandrel, winding a roll, removing the finished log, and cutting material in anticipation of another winding operation. As another example, a robotic assembly system may be configured so that the system positions components, fastens the components together, and then paints the assembly. Each task could be handled by a different module and could comprise a number of sub-processes. Generally speaking, the particular organization of tasks and functions may vary according to particular circumstances of a machine, depending on factors such as the purpose of the machine, materials produced by/operated on by the machine, the machine location, intensity of use, and other factors. As will be discussed below, in some embodiments, a sub-process carried out by a module may be implemented by components coordinated by a virtual master devoted to the sub-process. The sub-process virtual master may be synchronized to the module virtual master at an appropriate time.

The modules may be configured to perform tasks in any suitable manner. For example, in some embodiments, sub-processes may be carried out by providing physical motion to one or more machine components through the use of servo and other controls with electronic cam profile capability. A cam profile can be defined and motion imparted through the use of servo motors, actuators, and the like, so that the motion of the machine component(s) follows the cam profile. For instance, positioning apparatus 56 of the examples above may control the vertical position of a mandrel or other component based on a cam profile defined for a winding operation. As another example, a group of servos and corresponding cam profiles may control the position and motion of a robotic arm while another group of servos and corresponding cam profiles direct the operation of a component, such as a paint nozzle, handled by the arm. In some embodiments, the cam profile can be calculated based on other data specifying the desired motion, which may advantageously allow for re-definition of cam profiles by specifying alternative data, such as alternative profiles for different tasks or variations on tasks.

Alternatively or additionally to changing cam profiles, component motion may be varied in other ways, as well. For instance, as will be discussed later below, motion can be adjusted during an operation based on feedback such as sensor data and/or user input by varying the rate of one or more sub-system virtual master counts. As an example, during a winding operation, a roll may be biased while winding is in progress in order to account for variations in material thickness and other properties.

Generally speaking, when utilizing presently-known methods (i.e. "synchronous control"), the components of the system responsible for performing different tasks are slaved to a virtual or real master axis or encoder. For instance, a first process could operate on a material, followed by a second process, and then a third process. The positioning of the components for each process are dependent upon cam profiles of the master axis. For example, the first process can begin at a first time/position on the master axis, followed by the second process at a second time/position, and then by the third process at a third time/position. However, numerous problems could develop in the event of a fault or error. For example, if a fault were to occur during the second process, then the entire machine would likely need to be stopped to clear the fault. Furthermore, if all three processes were physically synchronized to the master axis, then the machine could not successfully begin operation until it had cycled through to the beginning of the first process. In systems using a virtual master axis and electronic cams, rather than running the virtual master to reset the components, the master could be reset. However, the machine would still have to be stopped in order to reset the virtual master axis to the initial position, since otherwise the machine could be damaged were the virtual master to be reset while the machine was in motion.

FIG. 28 illustrates several exemplary hypothetical timing diagrams for a machine. The time scale is arbitrary, and the designations of time are included for relative reference and example only. The horizontal axis is represented as "t" and time values are discussed; however, a control system may be implemented on the basis of count values rather than time values, which are used here for convenience. In these examples, generalized sub-processes carried out by the machine are associated with three different modules. For example, module 1 may comprise components that perform preliminary operations on a material, module 2 may comprise components that perform finishing operations, while module 3 comprises components that clean up waste and prepares new material for manipulation by module 1.

Figure 28A:
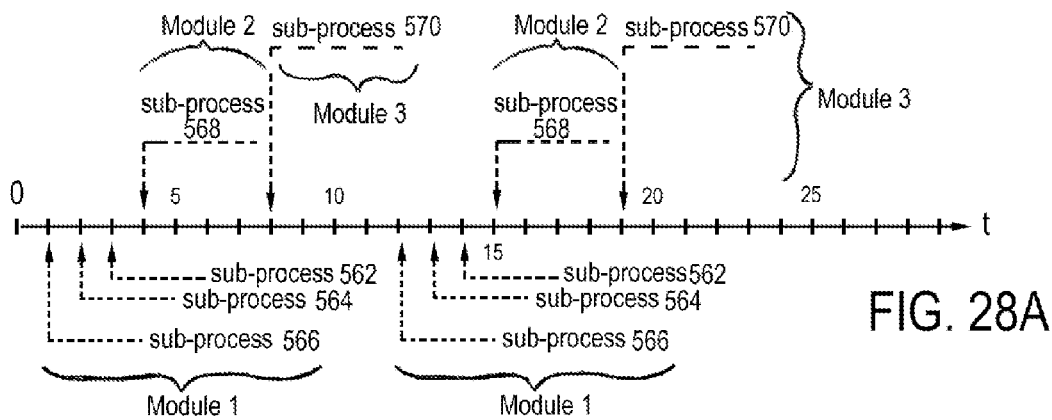
FIGS. 28A-28C illustrate several exemplary hypothetical timing diagrams for a generalized machine.

FIG. 28A illustrates the ideal operation of the machine. At t=1, the components comprising module 1 engage in sequence, namely performing sub-process 566 at t=1, sub-process 564 at t=2, and sub-process 562 at t=3. Next, the components of module 2 engage at t=4 to carry out sub-process 568 at t=4 after the sub-processes of module 1 are complete. At t=8, sub-process 570 is carried out by engaging the components comprising module 3. At t=12, the components of module 1 are again engaged and the machine begins another operational cycle.

Figure 28B:
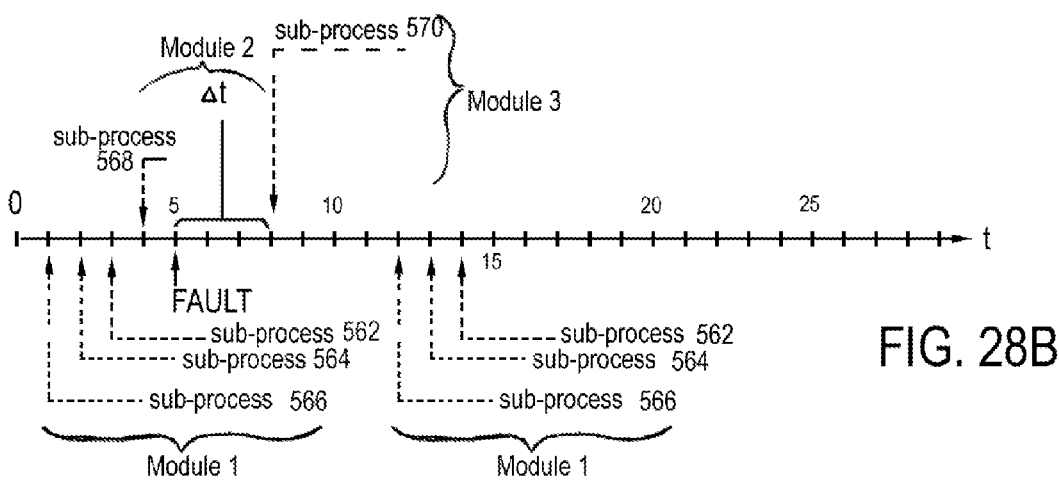

FIG. 28B illustrates an example of the occurrence of a fault and handling thereof in a system using conventional "synchronous control." At t=1, the components of module 1 are engaged and operate properly in sequence, with the components of module 2 engaged at t=4. However, in this example, a fault occurs at t=5. For example, module 2 may fail to perform the finishing operations due to a hardware failure. If the modules are operating on a material in sequence, then the partially-processed material may need to be discarded and the process re-initialized by clearing the material using module 3 (or otherwise cleared). Then, the machine operation will need to be re-started with module 1, likely involving re-homing of the machine. However, if the components of the machine are synchronized to a system (virtual) master, then the process may not begin anew in a timely manner and significant waste may be generated in the interim.

First, the machine may need to be stopped to clear the fault in module 2. Even if the machine is constructed with replaceable modules, a machine with a synchronized control system cannot "drop" a new module into the sequence without resetting the virtual master, which entails stopping the machine as noted above to avoid damage. If the machine is operating on a material moving through the machine at a high speed, starting and stopping the machine may result in appreciable amounts of waste as material moves through the machine during the startup and shutdown sequence. Even if the fault is cleared while avoiding stopping the machine, though, since the components of module 3 are synchronized to the system virtual master in this example, then module 3 will not engage until t=8, resulting in a delay of Δt=3. An operational delay of t=3 could result in extensive waste as material continues through the machine unprocessed or processed improperly. Additionally, time and energy are wasted while running the machine without producing the desired output.

In embodiments of the present subject matter, however, at least some of the sub-processes are not directly synchronized to the system virtual master. Instead, the system virtual master is used as a timing base for coordinating the operation of at least some of the machine components via one or more other sub-system virtual masters selectively synchronized to the system virtual master. One or more modules may comprise the components, with the one or more modules each having its own virtual master. Each module virtual master may be locked-in to the system virtual master when needed and as directed, with the sub-processes for each module timed relative to the module virtual master and not the system virtual master. Thus, the sub-processes of each module are not directly synchronized to the system virtual master, and so the components of the machine can be controlled "asynchronously." Additionally, as will be discussed below, the time involved in re-calculation of cam profiles may be advantageously reduced since the cam profiles will depend on the module virtual master rather than the system virtual master. Furthermore, some components can be operated completely independently of any master count value in some embodiments.

Figure 28C:
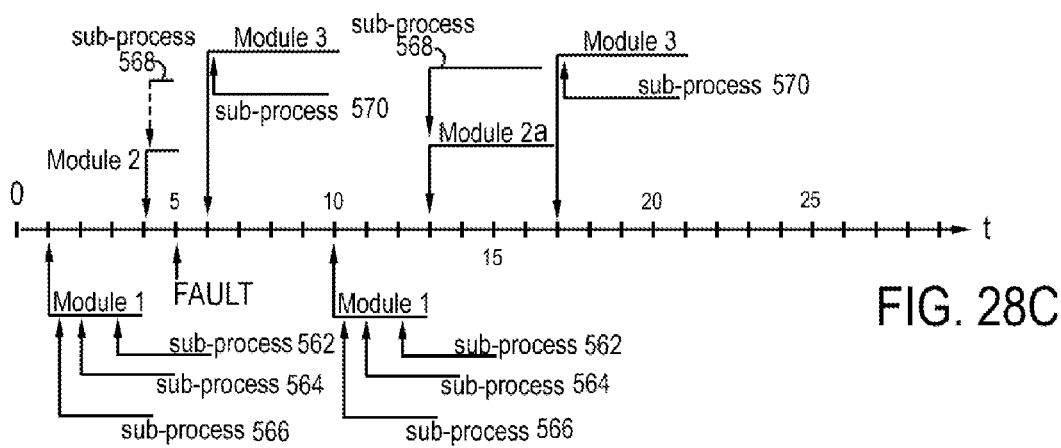

FIG. 28C illustrates the fault scenario of FIG. 28B, but in this example, the machine is configured so that the module sub-processes are synchronized to module virtual masters. For instance, sub-processes 566, 564, and 562 engage at t=0, 1, and 2 relative to the timing of module 1 virtual master. The respective sub-processes comprising modules 2 and 3 engage at t=0 relative to their respective module virtual masters. In this example, the module 1 virtual master is instructed to synchronize with the system virtual master at t=1. Thus, the first time the sub-processes of module 1 are executed, the sub-processes engage at the same times relative to the system virtual master as in the examples above. For example, since sub-process 564 is set to engage at t=1 relative to module 1 virtual master, and t=0 of module virtual master corresponds to t=1 of the system virtual master, then sub-process 564 will engage at t=2 relative to the system virtual master. Similarly, the module 2 virtual master is synchronized to the system virtual master at t=4 and the module 3 virtual master is initially planned to be synchronized to the system virtual master at, for instance, t=8.

As in the example of FIG. 28B, however, the components of module 2 develop a fault at t=5. In this example, though, the asynchronous distributed control configuration allows for the machine to continue operation.

First, module 3 is instructed to lock on to the system virtual master at t=8 or as soon as possible after the fault, such as at t=6. For instance, a machine central motion controller may receive a fault indication from module 2 and, as part of a control program, determine that module 3 is to be brought into operation as soon as possible to clear the fault. Module 3 may need some time before it can be brought into operation though. For example, module 3 may require time to be positioned and/or brought up to operating speed. Based on the operating speed of the machine, the known preparation time for module 3, and/or other parameters, central motion controller may determine that module 3 can be brought into operation at t=6 and therefore the central motion controller can send appropriate commands to module 3 to lock on at that time. Additionally, the central motion controller may attempt to clear module 2 from the machine, for example, by commanding module 2 to return to an inactive or offline position.

Furthermore, the machine central motion controller can adjust the timing for other operations. For example, module 1 is directed to lock on to the system virtual master at t=10 (rather than at t=12 as originally planned) so that its operations begin as soon as module 3 has completed operation. This can represent a substantial improvement in machine operation. For instance, if the components of module 1 were directly synchronized to the system virtual master, then each individual component would need to be re-synchronized. For example, cams corresponding to sub-processes 562, 564, and 566 would each need to be re-calculated so their respective components would be positioned to "begin" at t=10, 11, and 12, respectively, rather than at t=12, 13, and 14. However, since the sub-processes are synchronized to the module 1 virtual master, no re-calculation is required. Instead, the module 1 virtual master is directed to start at a different time based on the lock-on commands received from the machine central motion controller.

Continuing the example of FIG. 28C, a substitute module 2a is directed to lock on to the system virtual master at t=13 so the machine can continue operation while the fault in module 2 is investigated and cleared. For instance, the machine may comprise a plurality of modules capable of performing the sub-process 568 of module 2. Once module 2's fault condition is confirmed, machine central motion controller 10 may access data indicating which (if any) modules equivalent to module 2 have provided a "ready" signal. Assuming module 2a is an equivalent module and has provided a "ready" signal (for example, after having earlier completed an operational sequence), module 2a can be selected and directed to synchronize to the system virtual master at t=13.

In the above generalized examples, the particular aspects of the control sequences were presented in a simplified manner. For instance, when implementing the sub-processes and virtual masters, it may be preferable to configure sub-process timing and/or subsystem virtual master counts to avoid mechanical stresses involved in sudden starts/stops of components. For example, sub-processes of a module may be timed to module virtual masters in a manner to avoid engaging the sub-processes instantaneously when the virtual master begins, such as by avoiding commands requiring components to be at full operational speed at t=0. Exemplary ways of timing/synchronizing components and virtual masters to one another will be discussed below in conjunction with more detailed examples relating to the operation of an exemplary winder/rewinder.

III. Exemplary Aspects of Asynchronous Control Principles as Applied to a Modular Winding Machine Turning back to FIG. 27, an illustration is shown of an exemplary control architecture for a modular winder/rewinder such as discussed earlier in the present specification. System virtual master 600 provides overall process control and a timing base for the remaining components. In this example, the control system includes two module virtual masters 602a and 602b, each for a respective winding module. In this example, each winding module further comprises virtual masters for mandrel rotation (604a and 604b), mandrel lift (608a and 608b), and log strip/core load operations (606a, 606b), respectively. The exemplary control architecture of FIG. 27 further includes a cutoff virtual master 610, although specific sub-tasks for that module are not depicted in this illustration. Depending on the machine, other virtual masters may be used, such as for additional modules that provide perforation, apply adhesives or additives, or provide other functionality. A module "n" is also depicted to indicate that the architecture can comprise one or more additional module virtual masters.

Mandrel rotation virtual masters 604a and 604b may each coordinate a number of respective components involved in winding of a roll as discussed above. For instance, the characteristics of the rolled product will depend on factors such as the winding speed, tightness of the wind, and other characteristics. The behavior of the system components responsible for regulating winding speed, tightness, and other characteristics may be controlled through specification of differing cam profiles. For example, different cam profiles can be defined for different types of desired winds and for materials with different characteristics. For example, different cams may be defined for different sheet counts or desired roll diameters. As another example, different cams may be defined for different substrates, such as a different profiles for winding textile products, steel products, plastic products, and composite products. When a module is off-line (i.e. not engaged in a winding operation), the new cam profiles can be selected in order for the module to perform differently in its next operation.

In some embodiments, a sub-system virtual master, such as mandrel rotation virtual master 604a (or 604b) can be configured to respond to feedback during a winding operation. For example, as noted above, wind characteristics can be adjusted through specifying different cam profiles. However, additional, fine-grained control can be achieved by changing the count rate for a sub-system virtual master relative to the virtual master which it is synchronized to (e.g. the system virtual master or another sub-system virtual master).

Generally speaking, a first virtual master will count from a starting value to a final value over an operational cycle. The starting and final values for the first virtual master will correspond to a first and second count for another virtual master. In some embodiments, the rate of the first virtual master count can be adjusted during the count. For example, the count may initially proceed at a first rate and then be slowed to a second rate based on feedback. Before the end of the count, the rate may be increased to a third rate in order to bring the first virtual master count back into phase with the other virtual master count. The feedback may be provided, for example, based on sensor data regarding material inputs and/or finished products, and additionally or alternatively may be based on user input during operation.

In this example, the mandrel rotation virtual master begins counting at a specified time relative to the value of the module virtual master (which is itself timed relative to the system virtual master). By varying the rate of, for instance, the mandrel rotation virtual master count, the roll velocity may be changed on-the-fly in response to data, such as thickness variations or inhomogeneities in the source roll for the material being wound. Additionally or alternatively, similar results could be achieved by varying the rate of the module virtual master count. However, changing the rate of the module virtual master count would affect all other components/virtual masters timed to the module virtual master, which may or may not be desired depending on the circumstances.

Mandrel lift virtual masters 608a and 608b each coordinate respective components related to the vertical position of the mandrels, such as positioning apparatus 56 in the exemplary modules discussed above. For instance, at the start of a wind, the mandrel can be positioned proximate to the web and then moved away from the web as the product is wound. If mandrels are placed on a web from above, then the mandrel position will start close to the web and move vertically upward; the required motion will depend, of course, on the arrangement of the machine. The characteristics of the wind will depend on factors such as the amount of resistance or nip pressure imparted by the mandrel on the wound material, which will in turn depend on its vertical position (and other factors as well). Thus, different motion profiles for the mandrel lift components may be defined for different phases of the winding operation and different desired characteristics.

Figure 27:
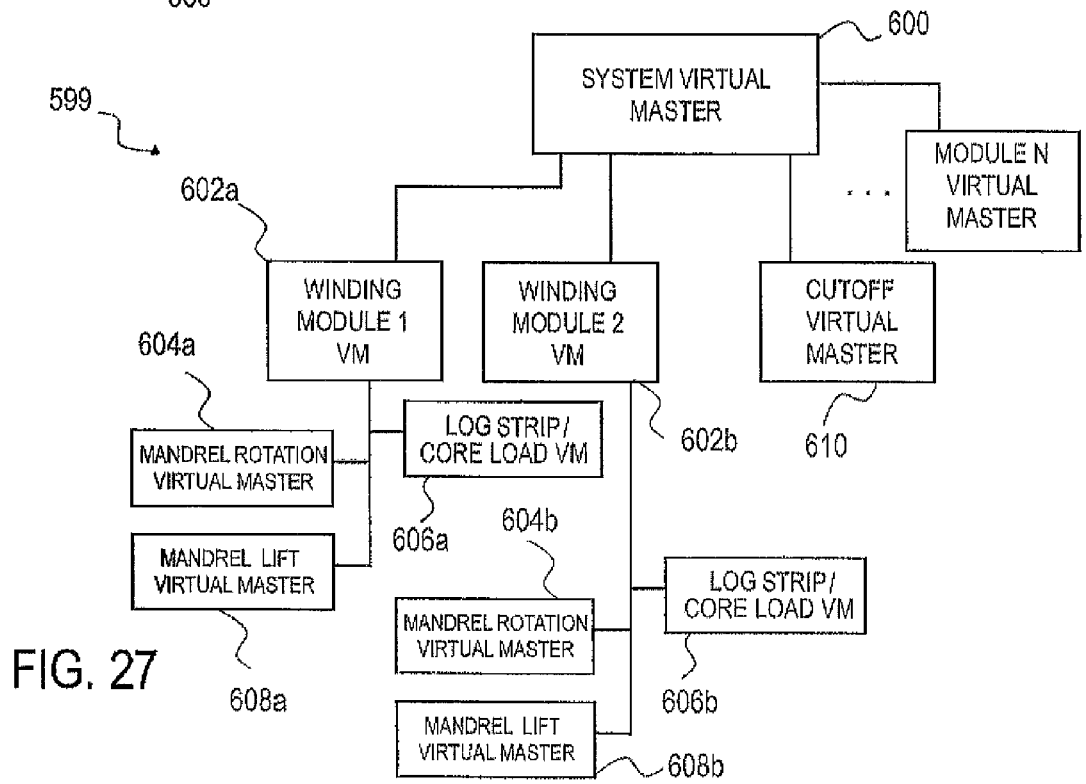
FIG. 27 is a block diagram of an exemplary control architecture for a modular winder/rewinder machine.

The cutoff virtual master 610 may provide control for one or more components used to separate the web for the beginning of a new winding operation. For example, a cutoff module may comprise components such as discussed above in conjunction with FIG. 15. However, in the following examples, an alternate embodiment, namely a cutoff bar configured to provide a pinch cut, is used for ease of explanation. Log strip/core load virtual master is also shown in FIG. 27. In some embodiments, as will be discussed below, actions such as core loading and log stripping may not be synchronized to any master counts and may, instead, rely on other signals such as the presence of a completed log or command that triggers the stripping and loading operation, which can proceed as a timed function.

Figure 29A:
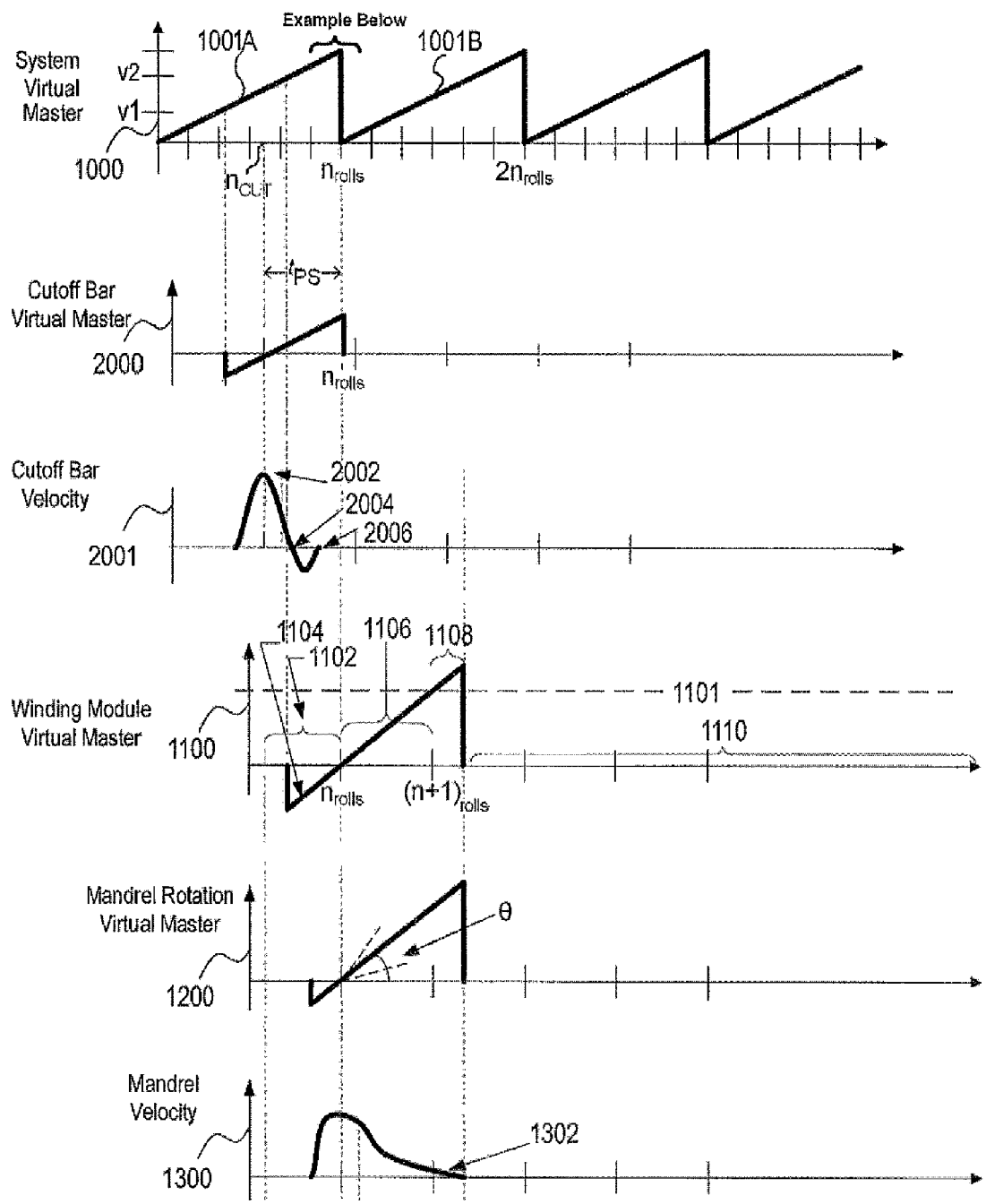
FIGS. 29A and 29B represent exemplary timing diagrams for components in an asynchronously-controlled winder/rewinder machine.
Figure 29B:
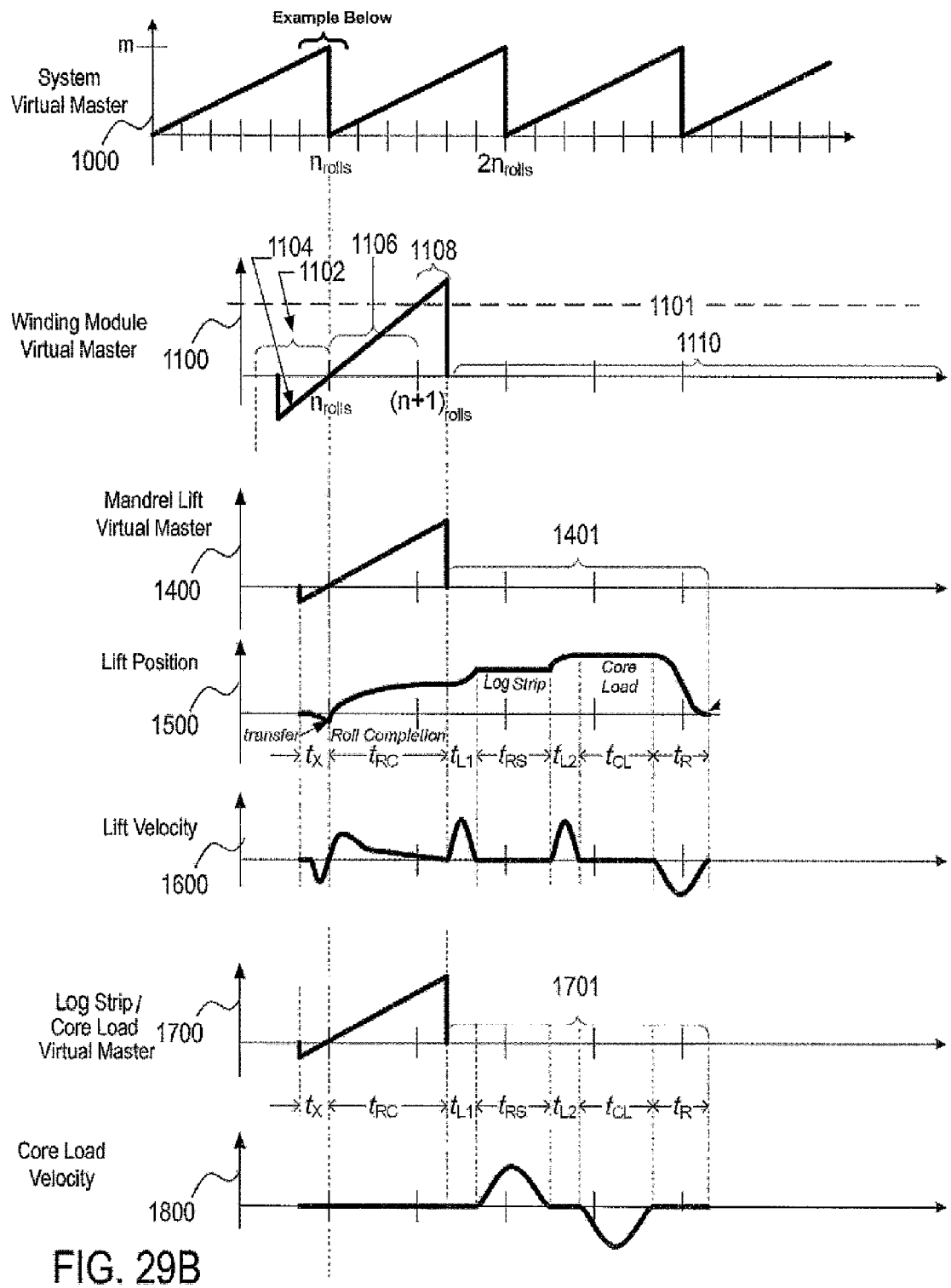

FIGS. 29A and 29B represent exemplary timing diagrams for components in an asynchronously-controlled winder/rewinder machine. The timing diagrams are not intended to present an exhaustive illustration of every component and operational scenario, but rather are hypothetical examples for use in illustrating the principles of the present subject matter. The horizontal axis generally represents time (per run speed), while the vertical axis for each graph is discussed in turn below.

Diagram 1000 illustrates an example of a system virtual master which may be generated by a control system in a machine configured for asynchronous control in accordance with the present subject matter. For example, the system virtual master may be generated by a machine central controller, either as an independent signal or based on the position of a master axis in the machine. As was noted above, the horizontal axis of diagram 1000 represents arbitrary units of time per run speed, since the present principles may be applied regardless of the speed of operation. The vertical axis represents the count value for the system virtual master illustrated generally as "m."

In operation, modules can be directed to operate in any suitable sequence by defining synchronization points which are based on the value of the virtual master. For instance, the count value of the virtual master can be selected to reach "m" at a time of $t=n_{rolls}$ on the horizontal axis. $n_{rolls}$ can define the end of a completed winding operational cycle 1001a wherein "n" rolls have been completed as well as defining the beginning of the next cycle 1001b. The number of modules and rolls used in an operational cycle will depend on the capabilities and other configuration parameters for the machine. For example, if a winding module can wind six rolls per cycle, then the operational cycle beginning at $t=n_{rolls}$ will involve winding the seventh through twelfth rolls.

The following examples discuss lock-on and other exemplary functionality involved in an exemplary winding operation that begins at $t=n_{rolls}$, which represents the point at which winding actually begins in the next cycle. However, it is important to note that the following examples relate to a single winding operation and that other winding, pre-winding, and/or post-winding operations associated with different modules may already be in progress, beginning, and/or ending during the time interval discussed in the following examples. Additionally, the relative scale of diagram 1000 differs from the remaining timing diagrams. Also, as was mentioned above, the actual time intervals may vary according to the speed of a machine. Diagrams 1100 through 2001 represent "zoomed in" views of particular portions which may occur within a single operational cycle, and so diagram 1000 is meant to be "to scale" with regard to count values as compared to the other diagrams.

Prior to the exemplary winding operation that begins at $t=n_{rolls}$ the material(s) being wound may need to be cut. Timing diagram 2000 illustrates a cutoff bar virtual master count value, while timing diagram 2001 illustrates the cutoff bar velocity as provided by one or more components of the cutoff bar that are synched to the cutoff bar virtual master. The cutoff bar virtual master itself is synchronized to the system virtual master so that at a certain system virtual master count the cutoff bar virtual master count begins. In this example, the cutoff module is directed to begin the cutoff bar virtual master count when the system virtual master is at value V1.

In this example, the cutoff bar virtual master in this example includes a portion where the count is a negative value. As was noted above, although asynchronous control allows for insertion and removal of components on the fly, mechanical stresses associated with starts and stops are generally to be avoided. For instance, module components are generally brought up to machine speed and then moved into full action. In general, this "startup" time frame can be accounted for in multiple ways. For instance, a virtual master count can be timed to start at a point sufficiently in advance of the time when the module needs to be at full speed. For example, if a module needs to be at full speed at a system virtual master count corresponding to t=x and requires a time interval of Δt to accelerate to machine speed, then the module virtual master can be directed to initialize at a system virtual master count corresponding to t=(x−Δt), with the module components synchronized to begin accelerating once the module virtual master begins counting.

However, in other embodiments, system resources (such as CPU cycles of the machine central motion controller) can be conserved by avoiding the need to calculate the time interval Δt. Instead, the module virtual master can be configured to begin counting at a negative value and end counting at a positive value, with the components of the module timed so that the zero crossing corresponds to the point at which the component(s) are no longer in a pre-operational phase. Thus, the negative count values can correspond to the pre-operation activities (e.g. accelerating to a needed speed, bringing components into a ready position, etc.), while the positive count values correspond to actual operation in a process. The machine central motion controller can then specify synchronization points by identifying a system master count when a module is to be in full operation, with the module(s) determining the count value at which the module virtual master count should begin. For instance, in these examples, the zero crossing is correlated to the time at which a component or module first makes contact with material being wound (e.g. point at which a cut is made, when winding begins, etc.).

In this example, the negative count values for cutoff bar virtual master correspond to acceleration of the cutoff bar to make the cut (indicated at point 2002 in cutoff bar velocity diagram 2001) when the cutoff bar module virtual master count crosses zero (i.e. at $t=n_{cut}$). Furthermore, the timing of the zero crossing for the cutoff bar virtual master is phase shifted by an amount $t_{PS}$ from $t=n_{rolls}$. This is due to the fact that, in this example, the cutoff bar needs to cut material prior to the beginning of a wind. In this example, the cutoff bar velocity increases to a point shown at 2002 for the desired velocity for a pinch cut, decelerates to zero at 2004 after the cut is made, and then reverses to return to the "ready" position at 2006. Although this example has discussed a single pinch cut, the cutoff bar can be configured to cut the material at any time or at a number of times using any appropriate style of cut. The phase difference between the cut and the start of a wind will depend on the speed of material through the machine, the desired point of engagement, amount of tail desired, distance from the perforator, operator-desired offset, and the like. Furthermore, based on information including the position of the cut, the machine central controller will direct a ready winding module or modules to synchronize its virtual master to a point on the system virtual master to engage the newly-cut material.

Product differentiation may be possible based on phasing cutoff and the point of engagement for various winding modules. For example, a first product with a first sheet count may be obtained by cutting material at a first number of system master counts (corresponding to a time period $t_{PS1}$) preceding the master count at which the first module virtual master crosses zero. Then, a second product with a second, greater, sheet count can be obtained by phasing the cutoff from the zero crossing for the second module virtual master by a second number of system virtual master counts (corresponding to a longer time period $t_{PS2}$).

Timing diagram 1100 illustrates a winding module virtual master. For instance, winding module 1 virtual master 602a and/or winding module 2 virtual master 602b of FIG. 27 may comprise a generated signal such as shown in diagram 1100. In this example, the vertical axis represents a module count value. The actual counts may comprise any suitable numeric (or other) representation, and the present subject matter is not intended to be limited to a specific data type or format for the counts. The module count value is used by the components of the module as a basis for performing functions. Additionally, in these examples, the modules may each comprise sub-processes which utilize their own respective sub-process virtual masters that are timed to the module virtual master. The module virtual master can be directed to lock on to the system virtual master at any desired point based on the desired position of the module in the machine sequence of operation, without regard to the speed of the machine, condition of the other modules, operator phasing, or the last lock-on position used by the module. The desired position may be defined as part of control program data that specifies one or more sequences of operation. For instance, the control program data may specify multiple operational sequences that include both normal operation and operation under specified circumstances, such as in the event of different fault conditions. In this example, the winding module virtual master is directed so that it locks on to the system virtual master at count V2, which corresponds to a time shortly before $n_{rolls}$.

The module count also begins at a value that is less than zero (i.e. a negative count value) shown at 1104. Use of a negative count value may advantageously reduce calculation time and otherwise provide for easier synchronization of modules in some embodiments. In this example, the initial count value is selected so that the count value remains negative during the period between initiating the module virtual master and the beginning of the actual winding operation at $n_{rolls}$. Time interval 1102 illustrates the a phase shift $t_{PS}$ between the beginning of winding and the cut (at $t=n_{cut}$) for the roll by the cutoff bar. The distance from cutoff will depend on the desired point of engagement, amount of tail, and so on, and is determined by the difference in timing between the module virtual master and the cutoff bar virtual master.

In FIGS. 29A-29B, the time interval over which winding occurs is represented at 1106. The time interval labeled as $t_{RC}$ in FIG. 29B includes time interval 1106 and additional post-winding time period 1108 for deceleration and the like. Functions and actions performed prior to the winding operation, such as lowering the mandrel and accelerating the mandrel to a desired velocity, may be timed to the negative module virtual master count values. Once the winding operation is completed, it continues until the roll is complete at $t=(n+1)_{rolls}$ or until an event (such as a fault) occurs that otherwise ends the winding operation on that particular module.

Time period 1108 may also be included during which the module virtual master continues counting beyond 100% of a roll wind (with the module count corresponding to a completed wind illustrated at the dashed line 1101). This additional time period may be used in some embodiments for post-wind operations performed by the mandrel and other winding components, such as deceleration, tail rotation, draw, and the like.

Additionally, the additional time period may allow for on-the-fly adjustments to module operation. For instance, as was noted above, fine tuning of winding (or other) operations can be accomplished through increasing and/or decreasing the count rate of a virtual master. For example, if the count rate for a mandrel rotation virtual master is changed in operation, the rotation rate of the mandrel can be varied. However, if the count rate is decreased, then there is a risk that the decrease could affect the timing of subsequent operations by making the winding operation take longer than was planned. Therefore, the module virtual master can, in some embodiments, include additional count values as a cushion for such adjustments.

Time period 1110 represents the time during which additional operations occur after the roll is produced by the winding module. During this time period, the module is not synchronized to the rest of the machine and is thus operating asynchronously. For instance, as will be discussed below, the log can be stripped and a new core loaded for use at some point after winding is complete. However, in some embodiments, these operations occur independently and are not dependent on a virtual master count value. For instance, depending on the configuration of the winder, the particular winding module following the virtual master timing shown in 1100 may produce a log and then enter a standby state while the winder/rewinder produces several other rolls using other winding modules.

Although in the exemplary timing diagrams of FIGS. 29A-29B, the post-winding operations occupy a time interval approximately equal to that used for the winding operations, this may not always be the case. As an example, the system virtual master (and thus the components and other virtual masters synchronized thereto) may count at a very high rate per unit of time in some cases. For example, actual winding operation for a paper product may occur at a high rate of speed with, $t_{RC}$ in some embodiments, comprises about 1 to 4 seconds. If the machine attempts to remove the completed log and load a core over that time frame (when, for instance, the minimum time frame for safe removal/loading is five seconds), damage to the machine and/or product could occur. Thus, as will be noted below, in some embodiments, the core loading/roll stripping aspects are decoupled from any system master through use of asynchronous control functions.

Timing diagram 1200 of FIG. 29A represents a mandrel virtual master that is slaved to a module virtual master. For instance, diagram 1200 may represent a straight-line "cam" to achieve specified winding characteristics using the mandrel based on the mandrel rotation virtual master count. Diagram 1300 represents the resulting velocity profile using a position cam that is based on the mandrel virtual master count value. In this example, a larger value for $\Theta$ will result in a tighter wind, while a smaller value for $\Theta$ will result in a looser wind. For instance, if $\Theta$ is higher, then the mandrel will advance through its position cam faster and will therefore rotate at a higher r.p.m. for a given length of material moving through the machine, resulting in a tighter roll.

The mandrel virtual master count is initialized when the winding module virtual master count reaches a specified value. As was the case with the module virtual master, the mandrel virtual master itself features an initial negative count which, in this example, is used to accelerate the mandrel so that the mandrel reaches the desired rotational velocity at $t=n_{rolls}$. Then, based on the mandrel count and as shown in diagram 1300, the mandrel velocity is decreased as the roll is wound and eventually nears or reaches zero. For instance, one or more electronic cam profiles can be developed to control the speed, braking, and torque of the motors) or other devices controlling the spin of the mandrel, with the positioning of the cam(s) calculated based on the mandrel virtual master count. In this example, time period 1108 represents the post-wind motion of the mandrel. If desired, the deceleration and tail positioning can occur completely independent of virtual master time.

As noted above, the use of independent module virtual masters and sub-process master such as mandrel rotation masters, can be used to define different motion profiles so that products made by modules can have different characteristics (e.g. tighter or looser winds, different sheet counts, different roll diameters, etc.). However, the same principles can also be used to obtain the same characteristics by modules that utilize different components.

For example, a first winding module may utilize a motor with a faster torque response than the motor in a second winding module. Thus, the motor in the second winding module may require a greater pre-operational time period to reach machine speed. The mandrel rotation virtual master for the second module may differ from that of the first module in order for the second module to provide the same operational performance. For example, the mandrel rotation virtual master for the second module may begin at a lower negative count value and end at a higher positive count value relative to the values of the mandrel rotation virtual master in the first module. Thus, the second module mandrel motor will begin startup at an appropriate time given its slower torque response. However, from the point of view of the machine central motion controller (and related control programs), the two modules can be commanded in the same manner by simply specifying a system master count values at which each module should engage without the need to calculate or otherwise account for the different pre-operational time intervals.

As was mentioned above, in some embodiments, on-the-fly adjustment of machine motion can be accomplished by varying the mandrel virtual master count rate. For instance, different winding velocity profiles can be defined as electronic cams to correlate mandrel velocity to the mandrel rotation virtual master count. However, with many motion controllers, the different cams are recalculated while the module is not in motion. Accordingly, once a module is in motion, no alterations can be made to the cam profile itself. However, by varying the gear ratio representing the ratio of a module virtual master count value to a system virtual master count value, variable winding profiles can be implemented. Of course, if the cams themselves can be modified while the module is in operation, then variable winding profiles may be implemented using a combination of varying count rates and cam characteristics.

As an example of changing winding profiles without changing cam characteristics, a tighter wind at the core of a roll can be obtained by initially increasing the mandrel rotation virtual master count rate and then decreasing the rate later on in the wind to loosen the wind at the outer portion of the roll. If the increase and decreased rates balance out, then the wind will occur over the same range of time (relative to the system virtual master) as a non-varied wind. However, if the decreased rate is not balanced out by the increased rate (e.g. the wind is looser), then a post-winding "cushion" in the module virtual master count may be desired to avoid synchronization troubles.

Turning to FIG. 29B, the mandrel lift virtual master represents another subsystem virtual master that is slaved to the module virtual master. Thus, the mandrel rotation and lift can be controlled independently of one another in this example. The vertical axis of diagram 1400 represents the mandrel lift virtual master count. As was the case of the mandrel virtual master and system virtual master, the lift virtual master count begins at a negative value selected so that the lift count reaches zero at the time that the roll wind begins. The mandrel lift virtual master count value is used as a basis for controlling the position/motion of the various lift positioning components. For example, one or more cam profiles can be developed to control the servos, actuators, and other components that change the vertical position of the mandrel, with the cam position based on the mandrel lift virtual master count. The lift position is illustrated at the vertical axis of diagram 1500 and lift velocity at the vertical axis of 1600, with lift velocity being the derivative of the position graph.

Based on the lift virtual master count, during time period $t_X$, the lift is lowered until the approximate engagement of the mandrel to the sheet of material (i.e. roll transfer). Then, the lift position is controlled to impinge into the sheet after transfer in order to deform the fabric and move web around the roll to begin the winding process. Once winding has begun, the lift position is controlled to rise according to desired roll characteristics during time period $t_{RC}$. In this example, time period 1401 represents operations after the mandrel lift count has ended and the lift virtual master is decoupled from the module virtual master.

Another advantageous application of on-the-fly adjustment can be found in varying the lift position during a winding operation. For example, a lift position motion profile may be defined based on a specified caliper of material, such as tissue that is being wound. Winding of a thicker material will result in a faster required rate of lift than a thinner material, assuming a constant winding rate and tightness. However, material, such as tissue, may vary from specifications. For example, when re-winding tissue that is being unwound from a parent roll, the wind requirements can change due to changing compressive stresses on the tissue as the parent roll decreases in size. Namely, tissue from different parts of the parent roll, which may for example have a diameter of twelve feet, can have varying caliper. Therefore, sensors can be included to determine the actual caliper of the incoming tissue, with the gear ratio of the mandrel lift virtual master adjusted based on the sensor data to increase or decrease the count rate for the mandrel lift virtual master and thereby allow for a faster or slower lift rate.

As shown in diagrams 1500 and 1600, after winding has completed, the lift is positioned for core loading and stripping operations. These operations represent asynchronous operations carried out independently of other machine functions. For instance, during time period $t_{L1}$, the lift is positioned for the log to be stripped, which occurs during $t_{RS}$. In this example, the core loading position is above the stripping position, so in time period $t_{CL}$ the lift is positioned for a new core to be loaded. Finally, during time period $t_R$, the lift is returned to "ready" status. The indication of "ready" status may also be used to indicate that the mandrel is ready to lock on to the module virtual master to begin a new winding operation and may further be used as an indication that the module virtual master is available to lock on to the system virtual master. Of course, the module preferably does not report back "ready" status to the machine central motion controller until all other components are also ready.

Timing diagram 1700 represents a log strip/core load virtual master count. The log strip/core load virtual master may be slaved to the system or subsystem virtual master at a suitable point so that a core may be loaded onto a mandrel and a roll stripped from the mandrel after winding is complete (or is otherwise halted). As with the other virtual masters, the log strip/core load virtual master count can begin at a negative initial count value so that the count equals zero at the time the winding operation begins. In this example, timing diagram 1800 illustrates the velocity of the core loading apparatus.

Furthermore, in this example, the core load velocity shows that the core loading and roll stripping maneuvers occur after the log strip/core load strip virtual master has completed a full count. This is because, in this embodiment, the load/strip operations are timed functions that occur independent of the count value of any master. Instead, once the log strip/core load virtual master reaches its maximum count value, the core strip operation is triggered and occurs during $t_{RS}$ following period $t_{L1}$. As noted above, $t_{L1}$ may represent a waiting period to allow for the mandrel lift to enter the log strip position. However, rather than a timed function, the subsequent motion actually is based on receiving commands from the module controller. For instance, the module controller may provide a command to the log strip/core load apparatus once the lift reaches a suitable position, among other prerequisites. After the log is stripped, another waiting period $t_{L2}$ occurs while the mandrel lift enters the core loading position. Then, during $t_{CL}$, the core is loaded and the log strip apparatus is returned to ready position.

By timing the core loading, log stripping, and related lift positioning functions independently of master counts, it is possible to avoid problems that may be encountered when the machine is operating at a speed that is incompatible with the desired handling of cores/finished products. Additionally, the remainder of the machine may continue to operate even in the event of a fault in the core loading/log stripping apparatus and/or core loading/log stripping can continue (if desired) even in the event of a fault during winding on other modules.

As was noted above, for example, if material is moving through the machine at a high rate of speed, then virtual master count rates (such as, for example, mandrel rotation count rates) generally will also be high. This may be advantageous, for example, in achieving a wind in a short amount of time. However, if core loading and roll stripping operations are synchronized at such speeds, then product damage and/or component damage can result. For instance, if a winding operation takes approximately 1 to 4 seconds and the roll stripping/core loading operation is synchronized to that speed, the completed rolls may be "slammed" around by too-rapid of a motion, which can dent or tear the rolls and/or possibly knock components out of alignment due to the momentum of the moving roll impacting the stripping components. As another example, a winding operation for a high sheet count may take longer than the optimal loading/unloading speed; thus, if the core load/log strip operation is timed, it is not unduly slowed by the timing of the winding operation. Accordingly, in such a case, the available utilization of a given module can be increased and the overall number of required modules may be reduced since modules can return to winding sooner.

Instead, modules, such as the log strip/core load module, can support master-independent timed functions in addition to functions timed from a virtual master. For example, the module controller may access a profile that defines motion over fixed time intervals and execute the profile upon occurrence of one or more events, such as a "log strip" or core load" command from the machine central motion controller. As another example, the timed functions may begin once the module virtual master count reaches its final value. In any event, once the timed functions begin, the module controller can then control the lift position and actions of the core load and roll stripping apparatus independent of the rate of the functions synchronized to the system or subsystem virtual master counts.

Of course, in other embodiments, components responsible for core loading and/or log stripping can be synchronized to one or more masters. Additionally, any suitable component(s) can be controlled by timed functions or by a combination of timed functions and synchronized functions. Although the example above discussed timed functions regarding core loading and log stripping, it is to be understood that other functions can be timed and/or commanded independently of master count values, whether at the module level or at the system level. Additionally, although in this example no log strip/core load apparatus motion is synchronized to the log strip/core load virtual master count value, this may not always be so. For instance, different winding characteristics can be achieved by varying the position of the core/partially wound roll during a winding operation. For example, by using the load/strip apparatus to oscillate the core in a transverse direction relative to the direction of the material being wound, spiral, cone, and other characteristics can be introduced.

A winder/rewinder may include other modules that can be selectively engaged to provide for different products during different winds. For example, an applicator module can comprise one or more components that apply an additive or additives, such as a lotion or antibacterial compound, to a web. For instance, one or more electronic cams may control a spray or other actuator. The additive(s) can be applied to certain lengths of material when winding a premium product, but not to other lengths of material. For example, the machine central motion controller may direct the cutoff module to provide a new leading edge and apply lotion to a length of web. The edge may be engaged and the material may be wound by a first module. Once the desired sheet length is reached, the web may be cut again to define a new leading edge. However, in the next wound log, no lotion or other additives are applied. The new leading edge is engaged by the next available winding module.

In some embodiments, the control system can support on-the-fly redefinition of the virtual master position. For instance, in the event of a fault, as noted above, a module may be de-synchronized and disengaged and the control system can determine which (if any) module is available to begin operation in place of the disengaged module(s). Rather than changing the lock-on point of the next available module(s), it may be advantageous to redefine the system virtual master count to a value just short of the next available module's lock-on point. For example, relatively speaking, a control system may require a significant time interval to recalculate and re-command winding modules to engage at different points in the event of a fault. During the time interval in which the module lock-on positions are re-calculated, significant amounts of material may move through the machine and such materials may be wasted if not operated upon. For example, in a winder/rewinder, product may continue to move through the machine on a conveyor that is not synchronized to any virtual master count. Therefore, by redefining the position of the virtual master instantaneously, waste can be reduced.

As was noted earlier, the principles of asynchronous control discussed herein can be scaled upward or downward. For instance, a system virtual master may correspond to a signal base for a machine comprising a plurality of modules, with some or all of the modules having virtual masters which begin counting at respective system master lock-on values. Each module may comprise components or sub-assemblies which each operate based on a component virtual master and/or sub-assembly virtual master which begin counting at respective module virtual master lock-on values.

However, in some embodiments, the control system may be used with multiple machines selectively synchronized to the same system virtual master. In such embodiments, each machine would be treated in the same manner as a module is treated in a single-machine embodiment.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A control system for use with a plurality of operational modules, the control system comprising at least one computing device configured to:
provide a system virtual master count that varies from an initial count value to a final count value over a series of system operational cycles;
command a first of a plurality of modules to operate at a first lock-on value of the system virtual master count during a first system operational cycle;
command a second of the plurality of modules to operate at a second lock-on value of the system virtual master count during the first system operational cycle; and
command at least one of the modules to operate at a third lock-on value of the system virtual master count;
wherein the third lock-on value occurs during another system operational cycle and is different from the lock-on value at which the module was commanded to operate at in the first system operational cycle.

2. The control system set forth in claim 1, wherein the at least one computing device is further configured to:
provide a module virtual master count for each respective operational module, each module virtual master count varying from an initial module count value to a final module count value over a module operational cycle; and
begin each respective module virtual master count so that the module operates at the commanded lock-on value of the system virtual master.

3. The control system set forth in claim 2,
wherein at least one module virtual master count values from an initial count value that is less than zero to a final count value that is greater than zero; and
wherein the at least one computing device is configured to begin the module virtual master count so that the module virtual master count value reaches zero at the commanded lock-on value of the system virtual master.

4. The control system set forth in claim 2, wherein the at least one computing device is further configured to:
provide a sub-system virtual master count for at least one sub-system of associated with a module, the sub-system virtual master count varying from an initial sub-system count value to a final sub-system count value over a sub-system operational cycle; and
begin the sub-system virtual master count when the virtual master of the associated module reaches a lock-on value.

5. The control system set forth in claim 2, wherein the at least one computing device is further configured to vary the rate of a module virtual master count so that the rate of the module virtual master count is not the same as the system virtual master count rate during at least a part of a system operational cycle.

6. The control system set forth in claim 4, wherein the at least one computing device is further configured to vary the rate of a sub-system virtual master count so that the rate of the sub-system virtual master count is not the same as the module virtual master count rate during at least part of a module operational cycle.

7. The control system set forth in claim 6, wherein the at least one computing device is configured to vary the rate of the sub-system virtual master count in response to a feedback signal.

8. The control system set forth in claim 6, wherein the at least one computing device is configured to increase the rate of the sub-system virtual master count and decrease the rate of the sub-system virtual master count during a module operational cycle so that the sub-system operational cycle ends at or before the end of the module operational cycle.

9. The control system set forth in claim 1, wherein each operational module corresponds to a functional module in the same machine.

10. The control system set forth in claim 1, wherein each operational module corresponds to one of a plurality of machines.

11. A method of asynchronously controlling a machine, the method comprising:
producing a system master count that varies from an initial count value to a final count value in a series of repeating system operational cycles, the system master count being produced by at least one computing device;
providing a plurality of sub-system master counts that each begin when the system master count reaches a respective lock-on count value;
operating at least one component based on a component operating profile and the value of a first sub-system master count;
receiving feedback during the operation of the at least one component, the feedback being received by the at least one computing device, and wherein, based on the feedback, adjusting the rate of the first sub-system master count and adjusting at least one other sub-system master count.

12. The method as set forth in claim 11, wherein the first sub-system master count is adjusted by being stopped without stopping the system master count.

13. The method as set forth in claim 12, wherein the at least one other sub-system master count is adjusted by being accelerated for operating a second component independently of the at least one component.

* * * * *